US012598595B2

(12) United States Patent
Zhang et al.

(10) Patent No.: US 12,598,595 B2
(45) Date of Patent: Apr. 7, 2026

(54) COMMUNICATION METHOD AND APPARATUS

(71) Applicant: HUAWEI TECHNOLOGIES CO., LTD., Shenzhen (CN)

(72) Inventors: Liangliang Zhang, Beijing (CN); Jianghua Liu, Beijing (CN); Xizeng Dai, Beijing (CN); Zheng Yu, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 18/159,998

(22) Filed: Jan. 26, 2023

(65) Prior Publication Data

US 2023/0164757 A1 May 25, 2023

Related U.S. Application Data

(63) Continuation of application No. PCT/CN2021/109523, filed on Jul. 30, 2021.

(30) Foreign Application Priority Data

Jul. 30, 2020 (CN) .......................... 202010754863.3

(51) Int. Cl.
*H04W 72/04* (2023.01)
*H04W 72/0453* (2023.01)
*H04W 72/542* (2023.01)

(52) U.S. Cl.
CPC ..... *H04W 72/0453* (2013.01); *H04W 72/542* (2023.01)

(58) Field of Classification Search
CPC ......................... H04W 72/0453; H04W 72/542
See application file for complete search history.

(56) References Cited

U.S. PATENT DOCUMENTS

| | | | | |
|---|---|---|---|---|
| 6,842,437 | B1 * | 1/2005 | Heath | H04B 7/212 370/348 |
| 2010/0172291 | A1 * | 7/2010 | Kim | H04W 48/20 370/328 |
| 2020/0229180 | A1 | 7/2020 | Liu et al. | |

FOREIGN PATENT DOCUMENTS

| | | |
|---|---|---|
| CN | 105790911 A | 7/2016 |
| CN | 107820726 A | 3/2018 |
| CN | 109392135 A | 2/2019 |

(Continued)

OTHER PUBLICATIONS

Chinese First Office Action issued in corresponding Chinese Application No. 202010754863.3, dated Mar. 13, 2025, pp. 1-15.

(Continued)

*Primary Examiner* — Brenda H Pham
(74) *Attorney, Agent, or Firm* — HAUPTMAN HAM, LLP

(57) ABSTRACT

A route configuration method includes determining, by a session management network element, that a first terminal in a first group is allowed to communicate with a second terminal in a second group. The route configuration method further includes sending, by the session management network element, first forwarding information to a first user plane network element. The first user plane network element is configured to provide a service for the first terminal. The first forwarding information is useable by the first user plane network element to forward a first packet. The first packet is to be sent by the first terminal to the second terminal.

20 Claims, 6 Drawing Sheets

(56)  References Cited

FOREIGN PATENT DOCUMENTS

| | | | |
|---|---|---|---|
| CN | 109803398 | A | 5/2019 |
| CN | 109803437 | A | 5/2019 |
| CN | 110859003 | A | 3/2020 |

OTHER PUBLICATIONS

3GPP TS 36.300 V16.1.0 (Mar. 2020), 3rd Generation Partnership Project; Technical Specification Group Radio Access Network;Evolved Universal Terrestrial Radio Access (E-UTRA) and Evolved Universal Terrestrial Radio Access Network (E-UTRAN);Overall description;Stage 2(Release 16), 387 pages.
3GPP TS 38.213 V16.2.0 (Jun. 2020), 3rd Generation Partnership Project; Technical Specification Group Radio Access Network;NR;Physical layer procedures for control(Release 16), 176 pages.
International Search Report issued in corresponding International Application No. PCT/CN2021/109523, dated Oct. 15, 2021, pp. 1-11.
India Office Action issued in corresponding India Application No. 202317011755, dated May 28, 2024, pp. 1-7.
Chinese Office Action issued in CN202010754863.3 dated Dec. 26, 2025.

* cited by examiner

COMMUNICATION METHOD AND APPARATUS

CROSS-REFERENCE TO RELATED APPLICATIONS

This application is a continuation of International Application No. PCT/CN2021/109523, filed on Jul. 30, 2021, which claims priority to Chinese Patent Application No. 202010754863.3, filed on Jul. 30, 2020. The disclosures of the aforementioned applications are hereby incorporated by reference in their entireties.

TECHNICAL FIELD

This application relates to the field of communication technologies, and in particular, to a communication method and apparatus.

BACKGROUND

With continuous development of communication technologies, a wireless communication system evolves from a first-generation analog communication system to a new radio (New Radio, NR) system. A requirement for transmitting uplink data to a network device by a terminal device increases in the NR system. Therefore, the network device needs to configure more time-frequency resources for the terminal device, to improve uplink signal coverage and an uplink data transmission capacity of the terminal device. For example, the new 4.9 GHz spectrum has a prospect of being used. 4.9 GHz provides a spectrum resource with a higher bandwidth and may provide more sufficient uplink resources. In this way, uplink coverage or an uplink throughput may be increased on the spectrum.

Currently, configuration extension of uplink transmission resources may be implemented by using a carrier aggregation (Carrier Aggregation, CA) technology and a supplementary uplink carrier (supplementary uplink, SUL) technology. An uplink carrier and a downlink carrier in the CA technology are associated and configured in pairs. For example, the terminal device may support carrier aggregation of a maximum of N uplink carriers, and N uplink carriers (Uplink, UL) correspond to N downlink carriers (Downlink, UL), that is, a maximum quantity of concurrent reception downlink carriers of the terminal device is the same as a maximum quantity of concurrent transmission uplink carriers. In this case, a carrier aggregation mechanism does not support a scenario in which a quantity of uplink carriers is greater than a quantity of downlink carriers. As a result, spectrum use is limited, and a carrier configuration mode is not flexible. In addition, the carrier aggregation mechanism requires that the terminal device have a capability of supporting concurrent transmission of N uplink carriers and N downlink carriers, which restricts a concurrent transmission capability of the terminal device to a certain extent, and is not suitable for a scenario in which uplink services increase sharply but downlink services are few.

In addition, the reason why the SUL technology is introduced is that uplink transmission of the terminal device is usually limited by power. Consequently, received signal strength of an uplink transmission signal upon arrival at a base station may be insufficient to ensure coverage performance of the terminal device. In addition, the uplink spectrum (uplink spectrum) may also be insufficient. Consequently, it is impossible to ensure uplink coverage performance of the terminal device by relying on data retransmission. Currently, NR introduces a supplementary uplink (supplementary uplink, SUL) as a candidate used when uplink coverage in an NR system is insufficient. A low frequency band of a long term evolution (long term evolution, LTE) communication system usually has better coverage performance, and SUL considers that, in an LTE low frequency band (for example, 700 MHz, 1.8 GHz, or 2.1 GHz), carriers are used for NR uplink transmission. Currently, it is determined that the terminal device may multiplex an LTE frequency band with LTE uplink time division duplex (time division duplex, TDD) or frequency division duplex (frequency division duplex, FDD) when performing NR transmission by using the frequency band. In the existing SUL technology, the terminal device detects quality of a signal on an NR frequency band. When the signal quality is lower than a preset threshold, the UE cannot meet an access requirement of the NR frequency band; in this case, the UE may switch to an LTE low frequency band. However, the terminal device supports only one SUL carrier (supplementary uplink carrier, supplementary uplink carrier), and no new supplementary uplink carrier can be added. Consequently, a capacity increase of uplink data transmission is limited. In addition, spectrum use is limited, and flexible configuration of uplink and downlink carriers cannot be implemented.

SUMMARY

This application provides a communication method and apparatus, to resolve a problem in a conventional technology that a carrier configuration mode is not flexible, and improve uplink signal coverage and uplink data transmission capacity.

To achieve the foregoing objective, this application uses the following technical solutions:

According to a first aspect, a communication method is provided. The method includes: determining a first uplink carrier, and determining a first cell and/or a first downlink carrier based on the first uplink carrier.

In the foregoing technical solution, a terminal device may determine the first uplink carrier, and determine the first cell based on the first uplink carrier; or a terminal device may determine that the first uplink carrier and the first downlink carrier are a cell. In this case, the terminal can flexibly configure at least one uplink carrier based on a service requirement to concurrently send uplink data. This can effectively increase uplink signal coverage and an uplink data transmission capacity.

In a possible design manner, the determining a first cell further includes: when the first uplink carrier is at least one uplink carrier, determining that each of the at least one uplink carrier is a cell; when the first uplink carrier is at least one uplink carrier, determining that the at least one uplink carrier is a cell; or when the first uplink carrier is at least one uplink carrier, determining that the at least one uplink carrier and the first downlink carrier are a cell. The determining a first downlink carrier includes: determining that the first uplink carrier and the first downlink carrier are associated carriers, where the first uplink carrier is used for uplink communication, the first downlink carrier is used for downlink communication, and a second downlink carrier corresponding to the first uplink carrier is configured for downlink measurement.

In the foregoing possible implementation, the terminal may determine at least one cell based on the determined at least one uplink carrier, and a configuration mode is flexible.

The at least one uplink carrier and at least one downlink carrier may be configured as associated carriers, or a plurality of uplink carriers may be configured as a cell, or the like. In this way, the terminal can flexibly configure and select an appropriate and optimal configuration combination of uplink and downlink carriers based on an uplink service transmission requirement, to improve performance of a communication system.

In a possible design manner, the determining a first uplink carrier specifically includes: determining the first uplink carrier based on a first message received from a network device, where the first message indicates the first uplink carrier or a channel parameter of the first uplink carrier; determining the first uplink carrier based on a downlink measurement signal received on the first uplink carrier; or determining the first uplink carrier based on a downlink measurement signal received on a second downlink carrier corresponding to the first uplink carrier.

In a possible design manner, the terminal may select, based on configuration information of at least one uplink carrier configured by the network device, a channel parameter of at least one uplink carrier, a downlink measurement signal detected by the terminal, or the like, a carrier with optimal signal quality as the first uplink carrier for determining uplink transmission. In this way, the terminal can flexibly select, add, or switch an uplink carrier under different resource configurations.

In a possible design manner, the method further includes: determining the first uplink carrier when at least one of the following conditions is met: channel quality of a third downlink carrier is less than or equal to a first threshold, and the third downlink carrier is used for downlink communication before the first uplink carrier is determined; a third downlink carrier is configured to correspond to a second uplink carrier and is used for downlink measurement before the first uplink carrier is determined, and the second uplink carrier is used for uplink communication before the first uplink carrier is determined; channel quality of the downlink measurement signal on the first uplink carrier is greater than or equal to a second threshold; or channel quality of the second downlink carrier is greater than or equal to a third threshold, and the second downlink carrier is configured to correspond to the first uplink carrier and is currently used for downlink measurement.

In a possible design manner, the terminal may determine, based on channel quality of the third downlink carrier currently used for downlink transmission or the quality of the downlink measurement signal corresponding to the first uplink carrier, whether the downlink carrier meets a trigger condition for switching of an activated carrier or an operating carrier. A person skilled in the art may flexibly set a preset threshold based on communication quality or a service requirement, and the terminal automatically selects, based on the preset threshold, an uplink carrier that meets a condition, so as to flexibly configure an uplink carrier and improve system performance.

In a possible design manner, before the determining a first uplink carrier, the method further includes: receiving a second message. The second message indicates that all resources of the first uplink carrier are used for uplink data transmission, the second message indicates that a part of resources of the first uplink carrier are used for downlink transmission, or the second message indicates that the first uplink carrier and the first downlink carrier are associated carriers.

In a possible design manner, the terminal may determine the first uplink carrier based on received different configuration modes for indicating several uplink carriers and different manners that are for determining the activated carrier or the operating carrier and that correspond to all uplink carriers, to improve efficiency of switching for a matched uplink carrier and improve system performance.

In a possible design manner, the method further includes: sending a third message when a first condition is met. The third message is used to request to release the second uplink carrier, and the second uplink carrier is used for uplink communication before the first uplink carrier is determined. The first condition includes at least one of the following: a quantity of uplink carriers available for uplink communication is greater than or equal to a fourth threshold; the channel quality of the third downlink carrier is less than or equal to a fifth threshold, and the third downlink carrier is used for downlink communication before the first uplink carrier is determined; the third downlink carrier is configured to correspond to the second uplink carrier and is used for downlink measurement before the first uplink carrier is determined; channel quality of the first downlink carrier is greater than or equal to a sixth threshold; the channel quality of the downlink measurement signal on the first uplink carrier is greater than or equal to an eighth threshold; or the channel quality of the second downlink carrier is greater than or equal to a ninth threshold, and the second downlink carrier is configured to correspond to the first uplink carrier and is currently used for downlink measurement.

In a possible design manner, before or after the terminal determines the first uplink carrier based on a service requirement, the terminal may choose to release the uplink carrier currently used for uplink transmission. In this way, the terminal can flexibly perform operating carrier switching based on a plurality of configured candidate uplink carriers, to improve system performance.

In a possible design manner, the determining a first uplink carrier includes: determining the first uplink carrier as an uplink carrier for uplink measurement; determining the first uplink carrier as an uplink carrier available for uplink communication; or determining the first uplink carrier as an uplink carrier for uplink communication.

In a possible design manner, the terminal may configure different candidate uplink carrier sets, for example, a measurement carrier for uplink measurement, an activated carrier that is used for switching or adding at any time and for performing uplink transmission, and an operating carrier for currently performing uplink transmission. In this way, the terminal can implement flexible configuration and extension of an uplink concurrent transmission capability based on a service transmission requirement, configuration information of a candidate uplink carrier set that is updated in real time, and quality of a detected signal, to improve system performance.

In a possible design manner, before the determining, by the terminal, at least one uplink carrier, the method further includes: The terminal receives a fourth message. The fourth message includes at least one of the following: a carrier frequency, a carrier index, a carrier identifier of the at least one uplink carrier, a random access configuration parameter, a reference signal configuration, or timing advance group TAG information.

In a possible design manner, if the terminal is currently in an idle mode or an inactive mode (Inactive mode), the determining, by the terminal, at least one uplink carrier specifically further includes: The terminal sends a preamble signal or a reference signal to at least one uplink carrier. The at least one uplink carrier is configured in the second message. The terminal receives the first message by using the first downlink carrier, and determines the at least one uplink carrier based on the first message.

In a possible design manner, the first information includes at least one of the following: carrier information, a timing advance TA value, signal power headroom, or a path loss of the at least one uplink carrier.

In a possible design manner, the method further includes: The terminal receives carrier information about a configuration of an uplink carrier. The carrier configuration information includes M measurement carriers, L activated carriers, and/or m operating carriers. The measurement carrier is a carrier for uplink signal measurement or downlink signal measurement, the activated carrier is a carrier that supports concurrent transmission of the terminal, and the operating carrier is a carrier on which the terminal actually sends uplink information or a carrier on which the terminal actually sends uplink data.

In a possible design manner, the method further includes: The terminal receives a fifth message, where the message includes a configuration of a measurement carrier; the terminal receives a sixth message, where the message includes a configuration of an activated carrier; and/or the terminal receives a seventh message, where the message includes a configuration of an operating carrier. The measurement carrier is a carrier for uplink signal measurement or downlink signal measurement, the activated carrier is a carrier capable of supporting concurrent transmission of the terminal, and the operating carrier is a carrier on which the terminal actually sends uplink information or a carrier on which the terminal actually sends uplink data.

In a possible design manner, the method further includes: The terminal receives an eighth message. The eighth message includes configuration information of the at least one measurement carrier. The terminal performs at least one of the following processing on the at least one measurement carrier, to determine the at least one operating carrier: sending the preamble signal or an uplink signal, performing uplink synchronization, performing uplink power control adjustment, performing uplink synchronization and uplink power control adjustment, performing random access to implement uplink synchronization, or performing random access to implement uplink synchronization and uplink power control adjustment.

In a possible design manner, the method further includes: The terminal sends a preamble signal or an uplink signal to the activated carrier based on received configuration information of the activated carrier; performing uplink synchronization with the activated carrier; performing uplink power control adjustment with the activated carrier; performing uplink synchronization and uplink power control adjustment with the activated carrier; performing random access on the activated carrier to implement uplink synchronization; or performing random access on the activated carrier to implement uplink synchronization and uplink power control adjustment.

In a possible design manner, the method further includes: The terminal sends the uplink information or the uplink data on the operating carrier based on the received configuration information of the operating carrier.

In a possible design manner, the method further includes: The terminal receives a ninth message. The ninth message includes configuration information of at least one activated carrier, and indicates the terminal to perform uplink data transmission by using the at least one activated carrier.

In a possible design manner, the method further includes: The terminal sends the uplink signal on the uplink carrier, the measurement carrier, the activated carrier, or the operating carrier, to measure signal quality of the uplink signal.

In a possible design manner, the method further includes: The terminal receives a tenth message, where the tenth message indicates that at least one third uplink carrier is a second cell, or at least one third uplink carrier and the first downlink carrier are associated carriers; the terminal sends an eleventh message, where the eleventh message indicates that at least one third uplink carrier is a second cell, or at least one third uplink carrier and the first downlink carrier are associated carriers.

In a possible design manner, the method further includes: The terminal sends a message for requesting to release the second uplink carrier, or sends a message for requesting to mark the second uplink carrier as an inactivated carrier.

In a possible design manner, the method further includes: The terminal updates the carrier configuration information of the uplink carrier based on a detected downlink reference signal of the at least one uplink carrier.

In a possible design manner, that the terminal updates the carrier configuration information of the uplink carrier based on a detected downlink reference signal of the at least one uplink carrier specifically includes: The terminal activates a measurement carrier if the terminal determines that quality of a downlink reference signal corresponding to the measurement carrier is greater than or equal to a threshold 10.

In a possible design manner, that the terminal updates the carrier configuration information of the uplink carrier based on a detected downlink reference signal of the at least one uplink carrier specifically includes: If the terminal determines that quality of a downlink reference signal corresponding to the activated carrier is greater than or equal to a threshold 11, the terminal switches the activated carrier to the operating carrier, to perform uplink data transmission.

In a possible design manner, that the terminal updates the carrier configuration information of the uplink carrier based on a detected downlink reference signal of the at least one uplink carrier specifically includes: If the terminal determines that quality of a downlink reference signal corresponding to the operating carrier is less than or equal to a threshold 12, the terminal sends a message for requesting to switching the operating carrier, to switch the operating carrier to the activated carrier or the measurement carrier.

According to a second aspect, a communication method is provided. The method includes: determining a first uplink carrier, and determining a first cell and/or a first downlink carrier based on the first uplink carrier.

In a possible design manner, the first uplink carrier is used for uplink communication, and the first downlink carrier is used for downlink communication.

In a possible design manner, the determining the first cell includes: determining that the first uplink carrier is the first cell; determining that the first uplink carrier and at least one uplink carrier are a cell; determining that the first uplink carrier and the first downlink carrier are a cell; or determining that the first uplink carrier, at least one uplink carrier, and the first downlink carrier are a cell. The determining a first downlink carrier includes: determining that the first uplink carrier and the first downlink carrier are associated carriers; determining that the first uplink carrier, the at least one uplink carrier, and the first downlink carrier are associated carriers; determining that the first cell and a second cell are associated cells, where the second cell includes the first downlink carrier; or determining that the first uplink carrier, the at least one uplink carrier, and the first downlink carrier are associated carriers, and determining that a second downlink carrier is used for downlink measurement, where the second downlink carrier is configured to be bound to the first uplink carrier to perform uplink transmission and downlink transmission.

In a possible design manner, before the determining a first uplink carrier, the method further includes: receiving a message 1. The message 1 indicates to support at least one of the following carrier configurations: all resources of an uplink carrier are used for uplink transmission, a part of resources of the uplink carrier are used for downlink transmission, and the uplink carrier or a downlink carrier are configured to be bound for uplink transmission and downlink transmission.

In a possible design manner, the determining a first uplink carrier includes: determining the first uplink carrier based on a message 2 received from a network device, where the message 2 indicates configuration information of the first uplink carrier; determining the first uplink carrier based on a downlink signal received on the first uplink carrier; or determining the first uplink carrier based on a downlink signal received on the second downlink carrier corresponding to the first uplink carrier.

In a possible design manner, the determining a first uplink carrier includes: determining the first uplink carrier when a first condition is met. The first condition includes at least one of the following: channel quality of a third downlink carrier is less than or equal to a threshold K1, and the third downlink carrier is used for downlink communication before the first uplink carrier is determined; channel quality of the downlink signal on the first uplink carrier is greater than or equal to a threshold K2; or channel quality of the second downlink carrier is greater than or equal to a threshold K3, and the second downlink carrier is configured to be bound to the first uplink carrier to perform uplink transmission and downlink transmission and is currently used for downlink measurement.

In a possible design manner, the method further includes: releasing a second uplink carrier; receiving a message 3, where the message 3 indicates to release a second uplink carrier; releasing a second uplink carrier when a second condition is met; or sending a message 4 when a second condition is met, where the message 4 is used to request to release a second uplink carrier. The second uplink carrier is used for uplink communication before the first uplink carrier is determined; and the second condition includes at least one of the following: a quantity of uplink carriers available for uplink communication is greater than or equal to a threshold L1; the channel quality of the third downlink carrier is less than or equal to a threshold L2, and the third downlink carrier is used for downlink communication before the first uplink carrier is determined; channel quality of the first downlink carrier is greater than or equal to a threshold L3; the channel quality of the first downlink carrier is greater than or equal to a threshold L4 and less than or equal to a threshold L5; the channel quality of the downlink signal on the first uplink carrier is greater than or equal to a threshold L6; or the channel quality of the second downlink carrier is greater than or equal to a threshold L7, and the second downlink carrier is configured to be bound to the first uplink carrier for uplink transmission and downlink transmission, and is currently used for downlink measurement.

In a possible design manner, the determining a first uplink carrier includes: determining the first uplink carrier as an uplink carrier for uplink measurement; determining the first uplink carrier as an uplink carrier available for uplink transmission; or determining the first uplink carrier as an uplink carrier for uplink transmission.

In a possible design manner, the method further includes: adding a third uplink carrier, and updating the first cell; changing a third uplink carrier to the first uplink carrier, and updating the first cell; or deleting the first uplink carrier, and updating the first cell.

In a possible design manner, the first downlink carrier and the third downlink carrier are a same uplink carrier.

In a possible design manner, before the determining a first uplink carrier, the method further includes: receiving the message 1, where the message 1 includes at least one of the following: a carrier frequency, a carrier index, a carrier identifier of the at least one uplink carrier, a random access configuration parameter, a reference signal configuration, or timing advance group TAG information.

In a possible design manner, before the determining a first uplink carrier, the method further includes: A terminal accesses the network device, where an uplink carrier used by the terminal to communicate with the network device is the second uplink carrier, and a downlink carrier used by the terminal to communicate with the network device is the third downlink carrier. The third downlink carrier is used for downlink communication before the first uplink carrier is determined, or the third downlink carrier is used to receive a downlink signal/downlink information before the first uplink carrier is determined.

In a possible design manner, the determining a first uplink carrier specifically further includes: sending a preamble signal or a reference signal to at least one uplink carrier; and receiving the message 4 by using the third downlink carrier; and determining, based on the message 4, that the at least one uplink carrier is the first uplink carrier.

In a possible design manner, the message 2 or the message 4 includes at least one of the following: carrier information, a timing advance TA value, signal power headroom, or a path loss of the at least one uplink carrier.

In a possible design manner, the method further includes: The terminal receives a message 5, where the message 5 includes a configuration of a measurement carrier; the terminal receives a message 6, where the message 6 includes a configuration of an activated carrier; and/or the terminal receives a message 7, where the message 7 includes a configuration of an operating carrier. The measurement carrier is a carrier for uplink signal measurement or downlink signal measurement; the activated carrier is a carrier capable of supporting concurrent transmission of the terminal; and the operating carrier is a carrier on which the terminal actually sends uplink information or a carrier on which the terminal actually sends uplink data.

In a possible design manner, the method further includes: The terminal sends a preamble signal or an uplink signal to the activated carrier based on received configuration information of the activated carrier, performs uplink synchronization with the activated carrier, performs uplink power control adjustment with the activated carrier, performs uplink synchronization and uplink power control adjustment with the activated carrier, performs random access on the activated carrier to implement uplink synchronization, or performs random access on the activated carrier to implement uplink synchronization and uplink power control adjustment.

In a possible design manner, the method further includes: The terminal sends the uplink information or the uplink data on the operating carrier based on the received configuration information of the operating carrier.

In a possible design manner, the method further includes: The terminal receives a message 9. The message 9 includes configuration information of at least one activated carrier, and indicates the terminal to perform uplink data transmission by using the at least one activated carrier.

In a possible design manner, the method further includes: The terminal sends the uplink signal on the uplink carrier, the measurement carrier, the activated carrier, or the operating carrier, to perform uplink measurement.

In a possible design manner, the method further includes: After updating the first uplink carrier, the terminal determines that the first uplink carrier is a cell or determines the first downlink carrier.

In a possible design manner, the terminal receives a tenth message, where the tenth message indicates that the at least one third uplink carrier is a second cell, or the at least one third uplink carrier and the first downlink carrier are associated carriers; or the terminal sends an eleventh message, where the eleventh message indicates that the at least one third uplink carrier is a second cell, or the at least one third uplink carrier and the first downlink carrier are associated carriers.

In an implementation, the third message or the fourth message further includes at least one of the following: a carrier index, a carrier identifier, a downlink reference signal identifier, and a carrier frequency that correspond to the at least one uplink carrier; indication information for requesting to release the first uplink carrier; or indication information for requesting to update the second uplink carrier.

In an implementation, the method further includes: The terminal receives carrier information about a configuration of an uplink carrier. The carrier configuration information includes M measurement carriers, L activated carriers, and/or m operating carriers. The measurement carrier is a carrier for uplink signal measurement or downlink signal measurement, the activated carrier is a carrier that supports concurrent transmission of the terminal, and the operating carrier is a carrier on which the terminal sends uplink information or a carrier on which the terminal sends uplink data.

In an implementation, the method further includes: The terminal receives an eighth message. The eighth message includes configuration information of the at least one measurement carrier. The terminal performs at least one of the following processing on the at least one measurement carrier, to determine the at least one operating carrier: sending the preamble signal or an uplink signal, performing uplink synchronization, performing uplink power control adjustment, performing uplink synchronization and uplink power control adjustment, performing random access to implement uplink synchronization, or performing random access to implement uplink synchronization and uplink power control adjustment.

In an implementation, the method further includes: The terminal updates the carrier configuration information of the uplink carrier based on a detected downlink reference signal of the at least one uplink carrier.

In an implementation, that the terminal updates the carrier configuration information of the uplink carrier based on a detected downlink reference signal of the at least one uplink carrier specifically includes: The terminal activates a measurement carrier if the terminal determines that quality of a downlink reference signal corresponding to the measurement carrier is greater than or equal to a threshold 10.

In an implementation, that the terminal updates the carrier configuration information of the uplink carrier based on a detected downlink reference signal of the at least one uplink carrier specifically includes: If the terminal determines that quality of a downlink reference signal corresponding to the activated carrier is greater than or equal to a threshold 11, the terminal switches the activated carrier to the operating carrier, to perform uplink data transmission.

In an implementation, that the terminal updates the carrier configuration information of the uplink carrier based on a detected downlink reference signal of the at least one uplink carrier specifically includes: If the terminal determines that quality of a downlink reference signal corresponding to the operating carrier is less than or equal to a threshold 12, the terminal sends a message for requesting to switching the operating carrier, to switch the operating carrier to the activated carrier or the measurement carrier.

According to a third aspect, a communication method is provided. The method includes: sending a first message, where the first message indicates at least one uplink carrier or a channel parameter of at least one uplink carrier; and receiving a third message from a terminal, where the third message is used to request to add or activate at least one first uplink carrier, and the first uplink carrier is a carrier that is used for uplink transmission and that is determined by the terminal from the at least one uplink carrier.

In a possible design manner, the method further includes: sending a second message. The second message indicates that all resources of the first uplink carrier are used for uplink transmission, the second message indicates that a part of resources of the first uplink carrier are used for downlink transmission, or the second message indicates that the first uplink carrier and a first downlink carrier are associated carriers.

In a possible design manner, the method further includes: receiving a third message from the terminal. The third message is used to request to release a second uplink carrier, and the second uplink carrier is used for uplink communication with the terminal.

In a possible design manner, the method further includes: sending response information to the terminal. The response information indicates to release a second uplink carrier or add the first uplink carrier.

In a possible design manner, the method further includes: receiving a fifth message from the terminal. The fifth message indicates at least one of the following: determining the first uplink carrier as an uplink carrier for uplink measurement; determining the first uplink carrier as an uplink carrier available for uplink communication; or determining the first uplink carrier as an uplink carrier for uplink communication.

According to a fourth aspect, a communication apparatus is provided. The apparatus includes a processing module. The processing module is configured to determine a first uplink carrier. The processing module is further configured to determine a first cell and/or a first downlink carrier based on the first uplink carrier.

In a possible design manner, the processing module is specifically configured to: when the first uplink carrier is at least one uplink carrier, determine that each of the at least one uplink carrier is a cell; when the first uplink carrier is at least one uplink carrier, determine that the at least one uplink carrier is a cell; or when the first uplink carrier is at least one uplink carrier, determine that the at least one uplink carrier and the first downlink carrier are a cell; determine that the first uplink carrier and the first downlink carrier are associated carriers, where the first uplink carrier is used for uplink communication, and the first downlink carrier is used for downlink communication; and determine that the first uplink carrier and the first downlink carrier are associated carriers, where the first uplink carrier is used for uplink communication, the first downlink carrier is used for downlink communication, and a second downlink carrier corresponding to the first uplink carrier is configured for downlink measurement.

In a possible design manner, the apparatus further includes: a receiving module, configured to receive a first message from a network device. The first message indicates the first uplink carrier or a channel parameter of the first uplink carrier. In this case, the processing module is specifically further configured to: determine the first uplink carrier based on the first message, determine the first uplink carrier based on a downlink measurement signal received on the first uplink carrier, or determine the first uplink carrier based on a downlink measurement signal received on the second downlink carrier corresponding to the first uplink carrier.

In a possible design manner, the processing module is specifically further configured to determine the first uplink carrier when at least one of the following conditions is met: channel quality of a third downlink carrier is less than or equal to a first threshold, and the third downlink carrier is used for downlink communication before the first uplink carrier is determined; a third downlink carrier is configured to correspond to a second uplink carrier and is used for downlink measurement before the first uplink carrier is determined, and the second uplink carrier is used for uplink communication before the first uplink carrier is determined; channel quality of the downlink measurement signal on the first uplink carrier is greater than or equal to a second threshold; or channel quality of the second downlink carrier is greater than or equal to a third threshold, and the second downlink carrier is configured to correspond to the first uplink carrier and is currently used for downlink measurement.

In a possible design manner, the receiving module is further configured to receive a second message. The second message indicates that all resources of the first uplink carrier are used for uplink data transmission, the second message indicates that a part of resources of the first uplink carrier are used for downlink transmission, or the second message indicates that the first uplink carrier and the first downlink carrier are associated carriers.

In a possible design manner, the apparatus further includes a sending module. The sending module is configured to send a third message when a first condition is met. The third message is used to request to release the second uplink carrier, and the second uplink carrier is used for uplink communication before the first uplink carrier is determined. The first condition includes at least one of the following: a quantity of uplink carriers available for uplink communication is greater than or equal to a fourth threshold; the channel quality of the third downlink carrier is less than or equal to a fifth threshold, and the third downlink carrier is used for downlink communication before the first uplink carrier is determined; the third downlink carrier is configured to correspond to the second uplink carrier and is used for downlink measurement before the first uplink carrier is determined; channel quality of the first downlink carrier is greater than or equal to a sixth threshold; the channel quality of the downlink measurement signal on the first uplink carrier is greater than or equal to an eighth threshold; or the channel quality of the second downlink carrier is greater than or equal to a ninth threshold, and the second downlink carrier is configured to correspond to the first uplink carrier and is currently used for downlink measurement.

In a possible design manner, the processing module is specifically further configured to: determine the first uplink carrier as an uplink carrier for uplink measurement; determine the first uplink carrier as an uplink carrier available for uplink communication; or determine the first uplink carrier as an uplink carrier for uplink communication.

According to a fifth aspect, a communication apparatus is provided. The apparatus includes: a sending module, configured to send a first message, where the first message indicates at least one uplink carrier or a channel parameter of at least one uplink carrier; and a receiving module, configured to receive a third message from a terminal, where the third message is used to request to add or activate at least one first uplink carrier, and the first uplink carrier is a carrier that is used for uplink transmission and that is determined by the terminal from the at least one uplink carrier.

In a possible design manner, the sending module is further configured to send a second message. The second message indicates that all resources of the first uplink carrier are used for uplink transmission, the second message indicates that a part of resources of the first uplink carrier are used for downlink transmission, or the second message indicates that the first uplink carrier and a first downlink carrier are associated carriers.

In a possible design manner, the receiving module is further configured to receive the third message from the terminal. The third message is used to request to release a second uplink carrier, and the second uplink carrier is used for uplink communication with the terminal.

In a possible design manner, the sending module is further configured to send response information to the terminal. The response information indicates to release a second uplink carrier or add the first uplink carrier.

In a possible design manner, the receiving module is further configured to receive a fifth message from the terminal. The fifth message indicates at least one of the following: determining the first uplink carrier as an uplink carrier for uplink measurement; determining the first uplink carrier as an uplink carrier available for uplink communication; or determining the first uplink carrier as an uplink carrier for uplink communication.

According to a sixth aspect, a communication apparatus is provided. The apparatus is configured to perform the method according to any one of the second aspect.

According to a seventh aspect, an electronic device is provided. The electronic device includes a processor and a transmission interface. The processor is configured to execute instructions stored in a memory, to perform the method according to any one of the first aspect or the second aspect.

According to an eighth aspect, an electronic device is provided. The electronic device includes a processor and a transmission interface. The processor is configured to execute instructions stored in a memory, to perform the method according to any one of the third aspect.

According to a ninth aspect, a computer-readable storage medium is provided. The computer-readable storage medium stores instructions. When the instructions are executed by a computer or a processor, the computer or the processor is enabled to perform the method according to any one of the first aspect or the second aspect.

According to a tenth aspect, a computer-readable storage medium is provided. The computer-readable storage medium stores instructions. When the instructions are executed by a computer or a processor, the computer or the processor is enabled to perform the method according to any one of the third aspect.

According to an eleventh aspect, a computer program product is provided. The computer program product may include program instructions. When the computer program product is run on a computer, the computer is enabled to perform the method according to any one of the first aspect or the second aspect.

According to a twelfth aspect, a computer program product is provided. The computer program product may include program instructions. When the computer program product is run on a computer, the computer is enabled to perform the method according to any one of the third aspect.

According to a thirteenth aspect, a communication system is provided. The communication system includes the apparatus according to the fourth aspect, the apparatus according to the fifth aspect, and the apparatus according to the sixth aspect.

According to a fourteenth aspect, a communication method is provided. The method is applied to a network device, and includes: receiving indication information of a first frequency band and a second frequency band from a terminal device; and using at least one uplink carrier and at least one downlink carrier in the first frequency band and/or the second frequency band as a cell of the terminal device based on the indication information.

In a possible design manner, the using at least one uplink carrier and at least one downlink carrier in the first frequency band and/or the second frequency band as a cell of the terminal device specifically includes: configuring any one or more downlink carriers in the first frequency band and any one or more uplink carriers in the second frequency band as the cell of the terminal device; or configuring any one or more downlink carriers in the second frequency band and any one or more uplink carriers in the first frequency band as the cell of the terminal device.

In a possible design manner, the using at least one uplink carrier and at least one downlink carrier in the first frequency band and/or the second frequency band as a cell of the terminal device specifically includes: configuring the at least one uplink carrier and the at least one downlink carrier in the first frequency band as the cell of the terminal device; or configuring the at least one uplink carrier and the at least one downlink carrier in the second frequency band as the cell of the terminal device.

According to a fifteenth aspect, a communication apparatus is provided. The apparatus is configured to perform the method according to any one of the fourteenth aspect.

According to a sixteenth aspect, an electronic device is provided. The electronic device includes a processor and a transmission interface. The processor is configured to execute instructions stored in a memory, to perform the method according to any one of the fourteenth aspect.

According to a seventeenth aspect, a computer-readable storage medium is provided. The computer-readable storage medium stores instructions. When the instructions are executed by a computer or a processor, the computer or the processor is enabled to perform the method according to any one of the fourteenth aspect.

According to an eighteenth aspect, a computer program product is provided. The computer program product may include program instructions. When the computer program product is run on a computer, the computer is enabled to perform the method according to any one of the fourteenth aspect.

It may be understood that any one of the communication apparatus, the electronic device, the computer-readable storage medium, and the computer program product may be configured to perform the corresponding methods provided above. Therefore, for beneficial effects that can be achieved by the communication apparatus, the electronic device, the computer-readable storage medium, and the computer program product, refer to beneficial effects in the corresponding methods provided above. Details are not described herein again.

DESCRIPTION OF EMBODIMENTS

Terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means at least two.

It should be noted that, in this application, terms such as "example" or "for example" are used for representing giving an example, an illustration, or a description. Any embodiment or design scheme described as an "example" or "for example" in this application should not be explained as being more preferred or having more advantages than another embodiment or design scheme. Exactly, use of the terms such as "example" and "for example" are intended to present a relative concept in a specific manner.

The following clearly describes the technical solutions in embodiments of this application with reference to the accompanying drawings in embodiments of this application. It is clear that the described embodiments are merely a part but not all of embodiments of this application. All other embodiments obtained by a person of ordinary skill in the art based on embodiments of this application without creative efforts shall fall within the protection scope of this application.

First, an implementation environment of embodiments of this application is briefly described.

Figure 1:
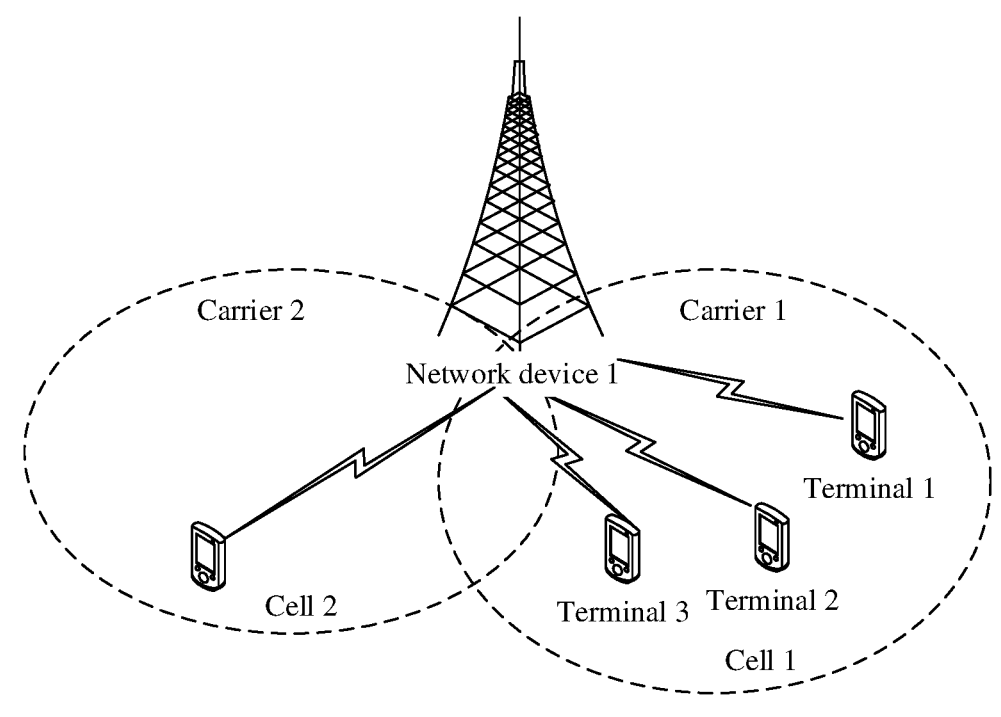
FIG. 1 is a diagram of an architecture of a communication system according to an embodiment of this application.

Embodiments of this application are applied to the communication system shown in FIG. 1, including a network device and at least one terminal device. The network device may include an access network device, and may further include a core network device, a device (for example, a server) of a service provider, and the like. This is not limited.

A carrier 1 and a carrier 2 are configured for the network device in embodiments of this application, and may cover at least one cell. For example, the carrier 1 covers a cell 1, and the carrier 2 covers a cell 2. The terminal device may access a network device in one of the cells, and send uplink data to the network device and/or receive downlink data sent by the network device.

The cell may be an area for providing a wireless communication service for the terminal device, and the network device may provide the wireless communication service for the terminal device in the area. One network device may manage at least one cell, and configure at least one pair of uplink and downlink carriers for each cell, to perform data transmission. Each cell corresponds to a cell identifier, and the cell identifier uniquely identifies the cell. If the terminal device camps on a cell and is to access the camped cell, the cell may be referred to as a camped cell or a serving cell (serving cell) of the terminal device, and a cell around the serving cell and a cell adjacent to the serving cell may be referred to as a neighboring cell or an adjacent cell of the serving cell.

It should be noted that FIG. 1 is merely an example framework diagram, and a quantity of nodes and a quantity of cells included in FIG. 1 are not limited. In addition to function nodes shown in FIG. 1, other nodes may be further included, for example, a core network device, a gateway device, or an application server. This is not limited. The access network device communicates with the core network device by using a wired network or a wireless network, for example, through a next generation (Next Generation, NG) interface.

The network device is mainly configured to implement functions such as resource scheduling, radio resource management, and radio access control of the terminal device. Specifically, the network device may include any node in a base station, a wireless access point, a transceiver point (Transmission Receive Point, TRP), a transmission point (Transmission Point, TP), and another access node. In embodiments of this application, an apparatus configured to implement a function of the network device may be a network device, or may be an apparatus, for example, a chip system, that can support the network device to implement the function. The apparatus may be installed in the network device, or may be used together with the network device. The technical solution provided in embodiments of this application is described by using an example in which an apparatus configured to implement a function of a network device is a network device.

The terminal device may be user equipment (User Equipment, UE), a mobile station (Mobile Station, MS), a mobile terminal (Mobile Terminal, MT), or the like. Specifically, the terminal device may be a mobile phone, a tablet computer, or a computer with a wireless transceiver function; or may be a virtual reality (Virtual Reality, VR) terminal, an augmented reality (Augmented Reality, AR) terminal, a wireless terminal in industrial control, a wireless terminal in self driving, a wireless terminal in remote medical, a wireless terminal in smart grid, a wireless terminal in smart city, smart home, a vehicle-mounted terminal, a wearable terminal device, or the like. The apparatus configured to implement a function of a terminal device may be a conventional terminal device or a narrowband terminal, or may be an apparatus that can support a terminal device to implement a function, for example, a chip system. The apparatus may be installed in the terminal device or used together with the terminal device. The following is described by using an example in which an apparatus configured to implement functions in this application is a terminal device.

Figure 2:
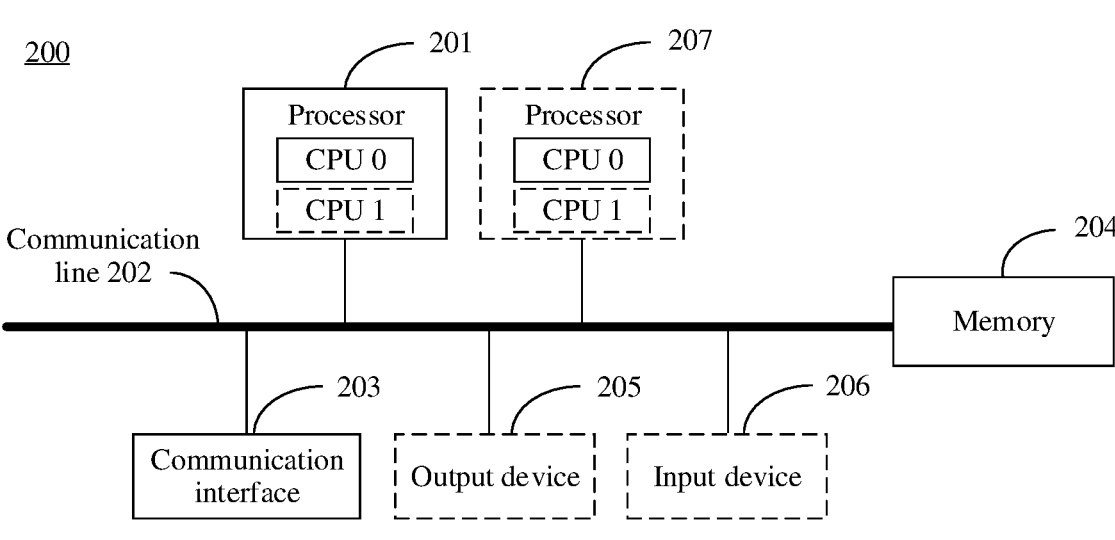
FIG. 2 is a diagram of an architecture of a communication apparatus according to an embodiment of this application.

During specific implementation, network elements shown in FIG. 1, for example, the terminal device and the network device, may use a composition structure shown in FIG. 2 or include components shown in FIG. 2. FIG. 2 is a schematic diagram of a structure of a communication apparatus 200 according to an embodiment of this application. When the communication apparatus 200 has functions of the terminal device in embodiments of this application, the communication apparatus 200 may be a terminal device, a chip in a terminal device, or a system on chip. When the communication apparatus 200 has the functions of the network device described in embodiments of this application, the communication apparatus 200 may be a network device, a chip in a network device, or a system on chip.

As shown in FIG. 2, the communication apparatus 200 may include a processor 201, a communication line 202, and a communication interface 203. Further, the communication apparatus 200 may further include a memory 204. The processor 201, the memory 204, and the communication interface 203 may be connected to each other through the communication line 202.

The processor 201 may be a central processing unit (Central Processing Unit, CPU), a general-purpose processor, a network processor (Network Processor, NP), a digital signal processor (Digital Signal Processing, DSP), a microprocessor, a microcontroller, a programmable logic device, or any combination thereof. The processor 201 may alternatively be another apparatus having a processing function, for example, a circuit, a component, or a software module.

The communication line 202 is configured to transmit information between components included in the communication apparatus 200.

The communication interface 203 is configured to communicate with another device or another communication network. The another communication network may be the Ethernet, a radio access network (Radio Access Network, RAN), a wireless local area network (Wireless Local Area Networks, WLAN), or the like. The communication interface 203 may be an interface circuit, a pin, a radio frequency module, a transceiver, or any apparatus that can implement communication.

The memory 204 is configured to store instructions. The instructions may be a computer program.

The memory 204 may be a read-only memory (Read-only Memory, ROM) or another type of static storage device that can store static information and/or instructions; may be a random access memory (Random Access Memory, RAM) or another type of dynamic storage device that can store information and/or instructions; or may be an electrically erasable programmable read-only memory (Electrically Erasable Programmable read-only Memory, EEPROM), a compact disc read-only memory (Compact Disc read-only Memory, CD-ROM) or another optical disc storage, an optical disc storage, a magnetic disk storage medium, or another magnetic storage device. The optical disc storage includes a compact optical disc, a laser disc, an optical disc, a digital versatile disc, a Blu-ray disc, or the like.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to perform a method provided in the following embodiments of this application.

In an example, the processor 201 may include at least one CPU, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display or a speaker.

It should be noted that the communication apparatus 200 may be a desktop computer, a portable computer, a network server, a mobile phone, a tablet computer, a wireless terminal, an embedded device, a chip system, or a device having a structure similar to a structure in FIG. 2. In addition, the composition structure shown in FIG. 2 does not constitute a limitation on the communication apparatus. In addition to the components shown in FIG. 2, the communication apparatus may include more or fewer components than components shown in the figure, combine some components, or have different component arrangements.

In this embodiment of this application, the chip system may include a chip, or may include a chip and another discrete component.

In an existing SUL technology, a terminal device detects quality of a signal on a downlink carrier of a base station in an NR frequency band, and when the signal quality is lower than a preset threshold, UE cannot meet an access requirement of the terminal device (that is, the UE does not access an uplink carrier bound to the downlink carrier correspondingly). In this case, the UE may access an SUL carrier. However, the terminal device supports only one SUL carrier (supplementary uplink carrier, supplementary uplink carrier). That is, the terminal device may select, based on signal quality of the downlink carrier, one of the uplink carriers as an actually operating uplink carrier. This technology cannot additionally add a new secondary uplink carrier. In addition, SUL belongs to a low frequency band of LTE, an increase in an uplink data transmission capacity is limited, and spectrum usage is limited. Consequently, uplink and downlink carriers cannot be configured flexibly.

A Definition (Definition 1) of a Cell:

Cell: a combination of downlink and optional uplink resources. The linking between a carrier frequency of the downlink resource and a carrier frequency of the uplink resource is indicated in system information transmitted on the downlink resource.

Optionally, a definition (definition 2) of a cell in the present invention may be a combination of a downlink resource and/or an uplink resource, where the downlink resource or the uplink resource is optional.

For content of the cell in the present invention, the "cell" in embodiments and claims of the present invention is not limited to the foregoing definition 1 of the cell or the foregoing definition 2 of the cell.

In all content of the present invention, a downlink resource of a carrier frequency may be referred to as a downlink carrier. Alternatively, an uplink resource of a carrier frequency may be referred to as an uplink carrier. Alternatively, a downlink resource may be referred to as a downlink carrier. An uplink resource may be referred to as an uplink carrier.

When a terminal device communicates with a network device by using an uplink resource of a carrier frequency A and a downlink resource of a carrier frequency B, if the terminal device obtains the uplink resource of the carrier frequency A by using a message, the message is not necessarily transmitted by using the downlink resource of the carrier frequency B. The message may be, for example, a system message or a dedicated message. This is not limited in the present invention.

The terminal device may determine the uplink resource of the carrier frequency A based on the system message or the dedicated message or in a preset manner. The terminal device may obtain the uplink resource of the carrier frequency A (uplink carrier A) by using the system message or the dedicated message or in the preset manner, to associate with a potential downlink resource of the carrier frequency (downlink carrier). In this case, the terminal device may determine the downlink carrier after determining the uplink carrier A.

Uplink resources or an uplink resource of some carrier frequencies or a carrier frequency (also referred to as an uplink carrier in the present invention) is determined by using the method of the present invention, to flexibly associate with a downlink resource of a carrier frequency B (downlink carrier B). In this case, the terminal device communicates with the network device by using the at least one uplink carrier and one downlink carrier. In this way, in a scenario in which uplink services increase sharply, when a terminal capability remains unchanged, more and better uplink resources can be obtained, and an uplink throughput can be improved.

In FIG. 1, when the terminal device is powered on or needs to perform cell handover, the terminal device needs to perform an initial access process based on a synchronization signal periodically broadcast by the network device. An objective of initial access is mainly to implement downlink synchronization with the network device and obtain system information of a cell. After the terminal device obtains the system information of the cell, the terminal device may determine whether the terminal device can camp on and/or access the cell, receive a paging message of the network device, and initiate a random access process to the network device, to establish a connection between the terminal device and the network device and perform data transmission.

Figure 3:
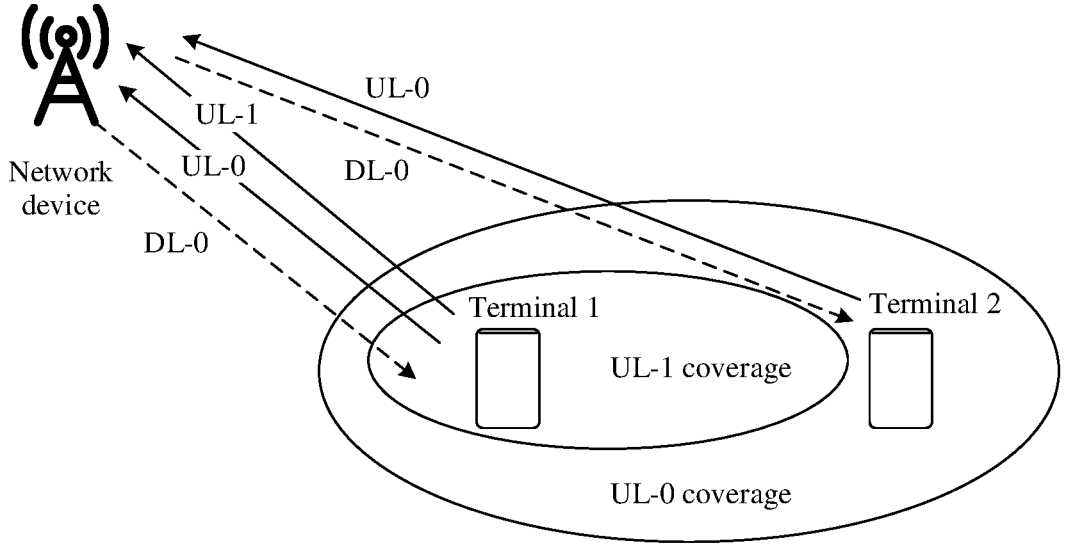
FIG. 3 is a schematic diagram of deployment of a communication system according to an embodiment of this application.

Based on the foregoing communication system, embodiments of this application may be specifically applied to two deployment scenarios: co-site deployment and non co-site deployment. As shown in FIG. 3, network devices are deployed in a co-site deployment architecture. A first uplink carrier UL-0 and a first downlink carrier DL-0 may be configured for a first network device. In addition, a second uplink carrier UL-1 and a second downlink carrier DL-1 may be further configured for the first network device.

For example, the first network device may be specifically a macro base station, and center frequency channel numbers of component carriers (Component Carrier, CC) of the first uplink carrier UL-0 and the first downlink carrier DL-0 may be 700 MHz, and frequency channel numbers of the CCs of the second uplink carrier and the second downlink carrier are 4.9 GHz.

In a possible implementation, a terminal 1 may receive downlink data of the first network device by using the 700 MHz downlink carrier DL-0, and the terminal 1 sends uplink data to the first network device concurrently by using the 700 MHz uplink carrier UL-0 and the 4.9 GHz uplink carrier UL-1. The terminal 1 may further send the uplink data to the first network device concurrently by using a plurality of 4.9 GHz uplink carriers. In addition, a terminal 2 in FIG. 3 may implement uplink and downlink transmission by using the 700 MHz uplink carrier UL-0 and the 700 MHz downlink carrier DL-0.

Figure 4:
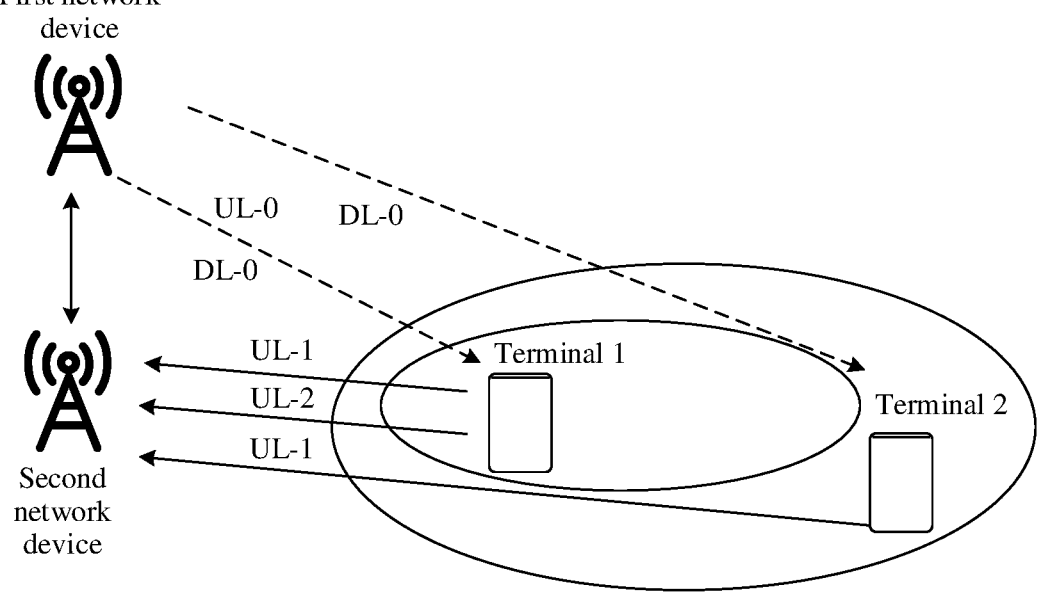
FIG. 4 is a schematic diagram of deployment of another communication system according to an embodiment of this application.

As shown in FIG. 4, network devices are deployed in a non co-site deployment architecture. A first uplink carrier UL-0 and a first downlink carrier DL-0 may be configured for a first network device. A second uplink carrier UL-1 and a second downlink carrier DL-1 may be configured for a second network device. The first network device and the second network device each may be a primary base station or a secondary base station.

For example, the first network device may be specifically a macro base station, and the second network device may be a remote radio frequency unit of the macro base station, or may be a micro base station. Specifically, the second network device may be deployed remotely by using an optical fiber cable or in another manner. A link between the first network device and the second network device may be considered as an ideal backhaul link (Backhaul). To be specific, there is no delay in communication transmission between the first network device and the second network device, or it is considered that a delay of communication transmission between the first network device and the second network device is negligible.

For example, the first network device is a macro base station, and the second network device is a micro base station. The macro base station may be configured to support 700 MHz uplink and downlink carriers UL-0+DL-0, which may be referred to as a macro uplink carrier and a macro downlink carrier. The micro base station may be configured to support 4.9 GHz uplink and downlink carriers UL-1+ DL-1 and a 2.3 G uplink carrier UL-2. In a possible implementation, a terminal 1 may receive downlink data of the first network device by using a downlink carrier DL-0, and send uplink data to the second network device concurrently by using uplink carriers UL-1 and UL-2. A terminal 2 in FIG. 4 may implement uplink and downlink transmission by using an uplink carrier UL-1 and a downlink carrier DL-0.

The terminal may send uplink data concurrently by using a plurality of 4.9 GHz uplink carriers. The plurality of 4.9 GHz uplink carriers may come from configuration resources of a same second network device, and the second network device and a third network device may come from configuration resources of different nodes (for example, the second network device and the third network device). After receiving the uplink data of the terminal, the second network device or the third network device may communicate with the first network device via Backhaul. In downlink transmission, the first network device transmits downlink data to the terminal by using a configured downlink carrier. For example, the first network device may send the downlink data to the terminal by using a 700 MHz downlink carrier.

The first network device, the second network device, and the third network device may separately connect to an access and mobility management function (Access and Mobility Management, AMF) or a user plane function (User Plane Function, PUF). This is not limited in this application.

Based on an architecture and an implementation scenario of the foregoing communication network, an embodiment of this application provides a communication method. The method may include the following steps.

S01: Determine a first uplink carrier.

The determining a first cell may specifically include:
determining that the first uplink carrier is a first cell;

determining that the first uplink carrier and at least one uplink carrier are a cell;

determining that the first uplink carrier and the first downlink carrier are a cell; or determining that the first uplink carrier, at least one uplink carrier, and the first downlink carrier are a cell.

The determining a first downlink carrier includes:

determining that the first uplink carrier and the first downlink carrier are associated carriers;

determining that the first uplink carrier, the at least one uplink carrier, and the first downlink carrier are associated carriers;

determining that the first cell and a second cell are associated cells, where the second cell includes the first downlink carrier; or determining that the first uplink carrier, the at least one uplink carrier, and the first downlink carrier are associated carriers, and determining that a second downlink carrier is used for downlink measurement, where the second downlink carrier is configured to be bound to the first uplink carrier to perform uplink transmission and downlink transmission.

S02: Determine a first cell and/or a first downlink carrier based on the first uplink carrier.

The first uplink carrier is used for uplink communication, and the first downlink carrier is used for downlink communication.

In an implementation, before the determining a first uplink carrier, the method further includes:

S03: Receive a message 1, where the message 1 indicates to support at least one carrier configuration, that is, at least one of the following carrier configurations:

all resources of an uplink carrier are used for uplink transmission;

a part of resources of the uplink carrier are used for downlink transmission; or the uplink carrier and a downlink carrier are configured to be bound for uplink transmission and downlink transmission.

In an implementation, the determining a first uplink carrier includes:

determining the first uplink carrier based on a message 2 received from a network device, where the message 2 indicates configuration information of the first uplink carrier; determining the first uplink carrier based on a downlink signal received on the first uplink carrier; or determining the first uplink carrier based on a downlink signal received on the second downlink carrier corresponding to the first uplink carrier.

In an implementation, the determining a first uplink carrier includes: determining the first uplink carrier when a first condition is met. The first condition includes at least one of the following: channel quality of a third downlink carrier is less than or equal to a threshold K1, and the third downlink carrier is used for downlink communication before the first uplink carrier is determined; channel quality of the downlink signal on the first uplink carrier is greater than or equal to a threshold K2; or channel quality of the second downlink carrier is greater than or equal to a threshold K3, and the second downlink carrier is configured to be bound to the first uplink carrier to perform uplink transmission and downlink transmission and is currently used for downlink measurement.

In an implementation, the method further includes: releasing a second uplink carrier; receiving a message 3, where the message 3 indicates to release a second uplink carrier; releasing a second uplink carrier when a second condition is met; or sending a message 4 when a second condition is met, where the message 4 is used to request to release a second uplink carrier. The second uplink carrier is used for uplink communication before the first uplink carrier is determined; and the second condition includes at least one of the following: a quantity of uplink carriers available for uplink communication is greater than or equal to a threshold L1; the channel quality of the third downlink carrier is less than or equal to a threshold L2, and the third downlink carrier is used for downlink communication before the first uplink carrier is determined; channel quality of the first downlink carrier is greater than or equal to a threshold L3; the channel quality of the first downlink carrier is greater than or equal to a threshold L4 and less than or equal to a threshold L5; the channel quality of the downlink signal on the first uplink carrier is greater than or equal to a threshold L6; or the channel quality of the second downlink carrier is greater than or equal to a threshold L7, and the second downlink carrier is configured to be bound to the first uplink carrier for uplink transmission and downlink transmission, and is currently used for downlink measurement.

In an implementation, the determining a first uplink carrier includes: determining the first uplink carrier as an uplink carrier for uplink measurement; determining the first uplink carrier as an uplink carrier available for uplink transmission; or determining the first uplink carrier as an uplink carrier for uplink transmission.

In an implementation, the method further includes: adding a third uplink carrier, and updating the first cell; changing a third uplink carrier to the first uplink carrier, and updating the first cell; or deleting the first uplink carrier, and updating the first cell.

In an implementation, the first downlink carrier and the third downlink carrier are a same uplink carrier.

Figure 5:
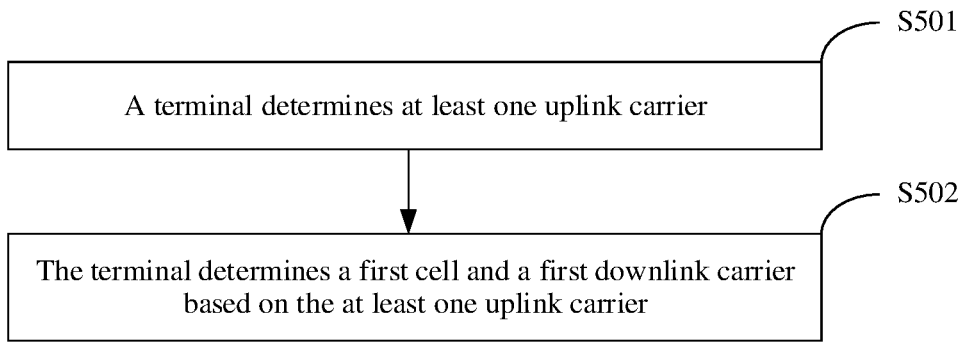
FIG. 5 is a flowchart of a communication method according to an embodiment of this application.

This application further provides another method. As shown in FIG. 5, the method includes the following steps.

S501: A terminal determines a first uplink carrier.

The first uplink carrier may be at least one uplink carrier, that is, the first uplink carrier may be one or more uplink carriers.

The terminal may specifically determine the first uplink carrier in at least one of the following manners.

Manner 1: Determine the first uplink carrier based on a first message received from a network device, where the first message indicates the first uplink carrier or a channel parameter of the first uplink carrier.

If all resources of an uplink carrier are used for uplink data transmission, the terminal may determine the at least one uplink carrier based on the received first message from the first network device. The first message may include frequency domain resource configuration information of the at least one uplink carrier, random access configuration information, or the like.

For example, the first message may include a carrier frequency, a carrier index, a carrier identifier, a random access configuration parameter, a reference signal configuration, timing advance group (Timing Advance Group, TAG) information, and the like. In this case, the terminal may initiate random access based on frequency domain resource information about a configuration of an uplink carrier by using a specified uplink carrier, send a measurement signal or a reference signal, and the like.

The first message may include a TA of the uplink carrier. The timing advance value (TA) corresponds to one or more uplink carriers, or timing advance values one-to-one correspond to one or more activated carriers, or the timing advance value corresponds to one or more activated carrier combinations.

The first message includes at least one of the following: the TA of the uplink carrier, an indication path loss, a path loss range, signal strength, a signal strength range, channel quality, or a channel quality range. In this case, the terminal determines an uplink transmit power on the first uplink carrier based on the content.

Specifically, the uplink carrier may be one or more uplink carriers.

Manner 2: Determine the first uplink carrier based on a downlink measurement signal received on the first uplink carrier.

It is assumed that a part of resources of the uplink carrier are used for resource configuration of downlink transmission, that is, the part of resources of the uplink carrier are used for uplink transmission, and a part of resources are used for downlink transmission, that is, a DL slot (slot). For example, a part of resources are downlink slots, and a downlink signal may be transmitted in downlink. The downlink signal may be a reference signal (Reference Signal, RS). In this case, the terminal may determine signal quality of the downlink signal on the uplink carrier, to determine the at least one uplink carrier.

A part of resources are used for downlink transmission. For example, a part of resources are downlink slots, and a first network device may periodically send a downlink reference signal to the terminal device by using the few downlink slots. The downlink reference signal may be a physical broadcast channel/synchronization signal block (physical broadcast channel/synchronous signal block, PBCH/SS block), a channel state information-reference signal (channel state information-reference signal, CSI-RS), or the like. In addition, downlink reference signals may be at a high density. The density of the downlink reference signals may be configured by a second network device for the terminal device.

In this application, the few downlink slots may mean: In a slot configuration period of every X slots, there may be one downlink slot and X-1 uplink slots, or there may be Y downlink slots and X-Y uplink slots. X may be a positive integer, for example, 20, 30, 40, or 60. Y is a positive integer less than X. For example, Y may be 2 or 3. For example, there are one downlink slot and X-1 uplink slots in a configuration period, and this method is applied by analogy for other configuration periods; or there are X-1 uplink slots and one downlink slot in a configuration period, and this method is applied by analogy for other configuration periods. One downlink slot may also be understood as a slot that includes a part of downlink symbols. In other words, one downlink slot may be referred to as a slot that includes a downlink symbol. A quantity of downlink symbols is configurable. Optionally, the quantity of downlink symbols may be configured by the first network device or the second network device by using RRC signaling. Optionally, the downlink symbols may be consecutive or non-consecutive. Optionally, a frequency band, a bandwidth part (Band width partial, BWP), or a physical resource block (Physical resource block, PRB) in which a downlink symbol is located is configurable.

For example, after receiving the downlink RS, the terminal may perform downlink measurement, and determine signal quality of the uplink carrier based on estimated signal quality of a received RS, to determine the uplink carrier.

Manner 3: Determine the first uplink carrier based on a downlink measurement signal received on a second downlink carrier corresponding to the first uplink carrier.

The terminal may determine, by using a downlink reference signal of a downlink carrier, at least one uplink carrier whose signal quality meets a condition. For example, the first uplink carrier is determined based on the downlink measurement signal received on the second downlink carrier corresponding to the first uplink carrier.

In an implementation, before step S501, that is, before that a terminal determines at least one first uplink carrier, the method further includes:

The terminal receives a second message from a network device. The second message indicates a resource configuration mode of an uplink carrier, and the resource configuration mode of the uplink carrier may include at least one of a mode 1, a mode 2, or a mode 3. The terminal may determine the at least one uplink carrier based on the resource configuration mode of the uplink carrier with reference to a detected downlink measurement signal, a detected downlink reference signal, or the like.

Mode 1: All resources of the uplink carrier are used for uplink data transmission.

Mode 2: A part of resources of the uplink carrier may be used for uplink data transmission.

Mode 3: One uplink carrier is associated with one downlink carrier.

Specifically, the second message may indicate that all resources of the first uplink carrier are used for uplink data transmission, the second message indicates that a part of resources of the first uplink carrier are used for downlink transmission, or the second message indicates that the first uplink carrier and a first downlink carrier are associated carriers.

For example, the second message may include six uplink carriers: UL-0, UL-1, UL-2, UL-3, UL-4, and UL-5. A resource configuration mode of each uplink carrier is further configured in the second message. For example, UL-1 and UL-2 support Mode 1. To be specific, resources of the uplink carriers UL-1 and UL-2 are all used for uplink data transmission. UL-3 and UL-4 support Mode 2. To be specific, a part of resources of the uplink carriers UL-3 and UL-4 are used for resource configuration of downlink transmission. UL-0 and UL-5 support Mode 3. To be specific, it indicates that the uplink carriers UL-0 and UL-5 are in a conventional configuration mode of binding an uplink subframe and a downlink subframe, and corresponding downlink carriers are DL-0 and DL-5.

In a possible implementation, the second message may further include at least one of the following: a carrier frequency, a carrier index, a carrier identifier of the at least one uplink carrier, a random access configuration parameter, or timing advance information. The second message may be a system message, or may be a dedicated message, for example, a radio resource control (Radio Resource Control, RRC) message.

In an implementation, when a configuration mode of the at least one uplink carrier indicated by the second message is Mode 1, the terminal may determine configuration information of the at least one uplink carrier based on at least one of the following content included in the second message: the carrier frequency, the carrier index, or the carrier identifier of the at least one uplink carrier, the random access configuration parameter, or the timing advance information, to perform random access or uplink signal measurement based on the configuration information, and determine, based on response information, at least one uplink carrier that meets the condition.

Further, in the foregoing three different modes, a process in which the terminal triggers an initial selection condition of an uplink carrier to determine the at least one uplink carrier is described in detail below. Details are not described herein again.

Further, that a terminal determines a first uplink carrier may specifically include: determining the first uplink carrier as an uplink carrier for uplink measurement, determining the first uplink carrier as an uplink carrier available for uplink communication, or determining the first uplink carrier as an uplink carrier for uplink communication. The "determining the first uplink carrier as an uplink carrier for uplink communication" may be equivalent to "determining the first uplink carrier as the uplink carrier for performing uplink communication", or may be equivalent to "determining the first uplink carrier as the uplink carrier for substantially performing uplink communication". Different specific cases are described in detail below, and details are not described herein.

The second message includes at least one of the following: a carrier frequency, a carrier index, a carrier identifier of an uplink carrier, a random access configuration parameter, a reference signal configuration, or timing advance group TAG information. The uplink carrier may be one or more carriers.

For example, the second message provides:

1. a carrier frequency, a carrier index, and a carrier identifier of an uplink carrier 1, a random access configuration parameter, a reference signal configuration, and TAG information;

2. a carrier frequency, a carrier index, and a carrier identifier of an uplink carrier 2, a random access configuration parameter, a reference signal configuration, and TAG information; and 3. a carrier frequency, a carrier index, and a carrier identifier of an uplink carrier 3, a random access configuration parameter, a reference signal configuration, and TAG information.

The terminal may implement synchronization and power adjustment of the uplink carrier based on the information provided by the second message. Specifically, the terminal may send a preamble or reference information on the uplink carrier based on the information provided by the second message, to obtain synchronization and power adjustment related information of the uplink carrier, and determine a first cell and/or a first downlink carrier.

S502: The terminal determines a first cell or the first downlink carrier based on the first uplink carrier.

The terminal may determine at least one cell based on the determined first uplink carrier. The first uplink carrier may be at least one uplink carrier. The following steps may be included.

1. Determine that each of the at least one uplink carrier is a cell.

In this case, the terminal may send uplink data or uplink information by using any uplink carrier.

Figure 6:
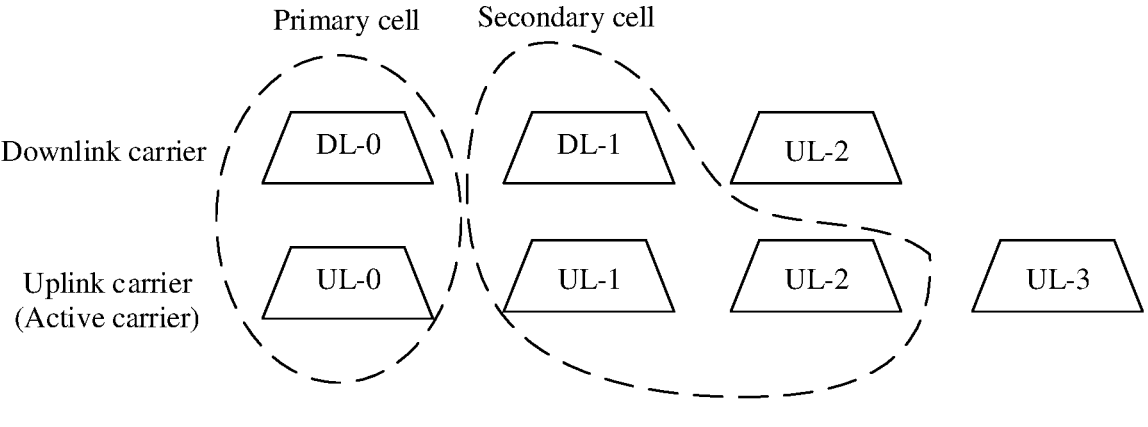
FIG. 6 is a schematic diagram of configuration of uplink and downlink carriers according to an embodiment of this application.

For example, as shown in FIG. 6, the terminal determines that a UL-CC 1 corresponding to UL-1 is a cell 1, and the terminal determines that a UL-CC 2 corresponding to UL-2 is a cell 2.

2. Determine that the at least one uplink carrier is a cell.

In this case, the terminal may send the uplink data by using the at least one uplink carrier based on a maximum quantity of concurrent transmissions for concurrently sending uplink data.

For example, the terminal determines that a UL-CC 1 and a UL-CC 2 corresponding to UL-1 and UL-2 are a cell 3.

3. Determine that the at least one uplink carrier and the first downlink carrier are a cell.

In this case, the terminal may send the uplink data by using the at least one uplink carrier, and receive downlink data by using the first downlink carrier; or the terminal may concurrently send the uplink data by using the at least one uplink carrier based on a maximum quantity of concurrent transmissions for concurrently sending uplink data, and receive downlink data by using a downlink carrier.

For example, the terminal determines that UL-1 and DL-0 are a cell 4, or the terminal determines that UL-1, UL-2, and DL-0 are a cell 4.

The terminal may specifically determine the first downlink carrier in the following manner:

Manner 1: The terminal determines that the first uplink carrier and the first downlink carrier are associated carriers, where the first uplink carrier is used for uplink communication, and the first downlink carrier is used for downlink communication.

Manner 2: The terminal determines that the first uplink carrier and the first downlink carrier are associated carriers, where the first uplink carrier is used for uplink communication, the first downlink carrier is used for downlink communication, and a second downlink carrier configured by the network device to correspond to the first uplink carrier is used for downlink measurement.

4. The terminal may determine that the at least one uplink carrier and the first downlink carrier are associated carriers.

In this case, the terminal may concurrently send, by using the at least one uplink carrier, the uplink data based on a maximum quantity of concurrent transmissions for concurrently sending uplink data, and receive downlink data by using the downlink carrier.

For example, the terminal determines that UL-1 and DL-0 are associated carriers, or the terminal determines that UL-1, UL-2, and DL-0 are associated carriers.

5. If the terminal determines that a downlink carrier corresponding to an uplink carrier is a second downlink carrier DL-2, the terminal may send uplink data by using an uplink carrier UL-2, and receive downlink data by using a first downlink carrier DL-1.

As shown in FIG. 6, the terminal determines that UL-1 and DL-0 are associated carriers, or the terminal determines that UL-1, UL-2, and DL-1 are associated carriers. However, the terminal does not receive the downlink data by using a second downlink carrier DL-2, that is, the downlink carrier DL-2 is actually a virtual carrier and is not used by the terminal. Alternatively, the terminal may receive a downlink reference signal by using a second downlink carrier, to measure a downlink signal.

6. Determine a cell or a first cell based on the first uplink carrier, associate with a cell, where there is a downlink carrier for the cell; and perform uplink communication by using the uplink carrier, and perform downlink communication by using the downlink carrier.

For example, the terminal determines an uplink carrier to determine that UL-CC 1 corresponding to UL-1 is a cell 1, and associates with a cell 3. The cell 3 includes a downlink carrier DL-CC 3. In this case, the terminal performs uplink communication by using the cell 1, and performs downlink communication by using the cell 3. Both the cell 1 and the cell 3 are cells that serve the terminal.

For example, the terminal determines an uplink carrier to determine that UL-CC 1 corresponding to UL-1 is a cell 1, and associates with a cell 4. The cell 4 includes a downlink carrier DL-CC 4 and an uplink carrier UL-CC 4. In this case, the terminal performs uplink communication by using the cell 1, and performs downlink communication by using DL-CC 3 of the cell 3. Both the cell 1 and the cell 3 are cells that serve the terminal.

In an implementation, in step S501, the terminal may determine the first uplink carrier by using the following initial selection condition that triggers an uplink carrier. That is, the terminal determines the first uplink carrier when at least one of the following conditions is met:

(1) Channel quality of a third downlink carrier is less than or equal to a first threshold, where the third downlink carrier is used for downlink communication before the first uplink carrier is determined, or the third downlink carrier is configured to correspond to a second uplink carrier and is used for downlink measurement before the first uplink carrier is determined, and the second uplink carrier is used for uplink communication before the first uplink carrier is determined.

(2) Channel quality of a downlink measurement signal on the first uplink carrier is greater than or equal to a second threshold; or channel quality of a second downlink carrier is greater than or equal to a third threshold, and the second downlink carrier is configured to correspond to the first uplink carrier and is currently used for downlink measurement.

In the foregoing implementation provided in this application, the terminal determines the at least one uplink carrier based on downlink measurement and carrier information configured by the network device, to transmit uplink data by using the at least one uplink carrier as a carrier for uplink transmission; and determine the selected at least one uplink carrier as a cell, or determine the selected at least one uplink carrier and a downlink carrier for performing downlink transmission as associated carriers, to perform uplink and downlink data transmission. In this way, when the terminal cannot expand or increase a concurrent downlink data transmission capability, the terminal may flexibly perform selection and configuration based on a plurality of configured uplink carriers, flexibly increase a quantity of uplink carriers based on a service requirement, and select an uplink carrier with high uplink signal quality to perform concurrent uplink transmission. This effectively increases uplink signal coverage and uplink data transmission capacity.

Specific implementations in different resource configuration modes of an uplink carrier are separately described below.

Figure 7:
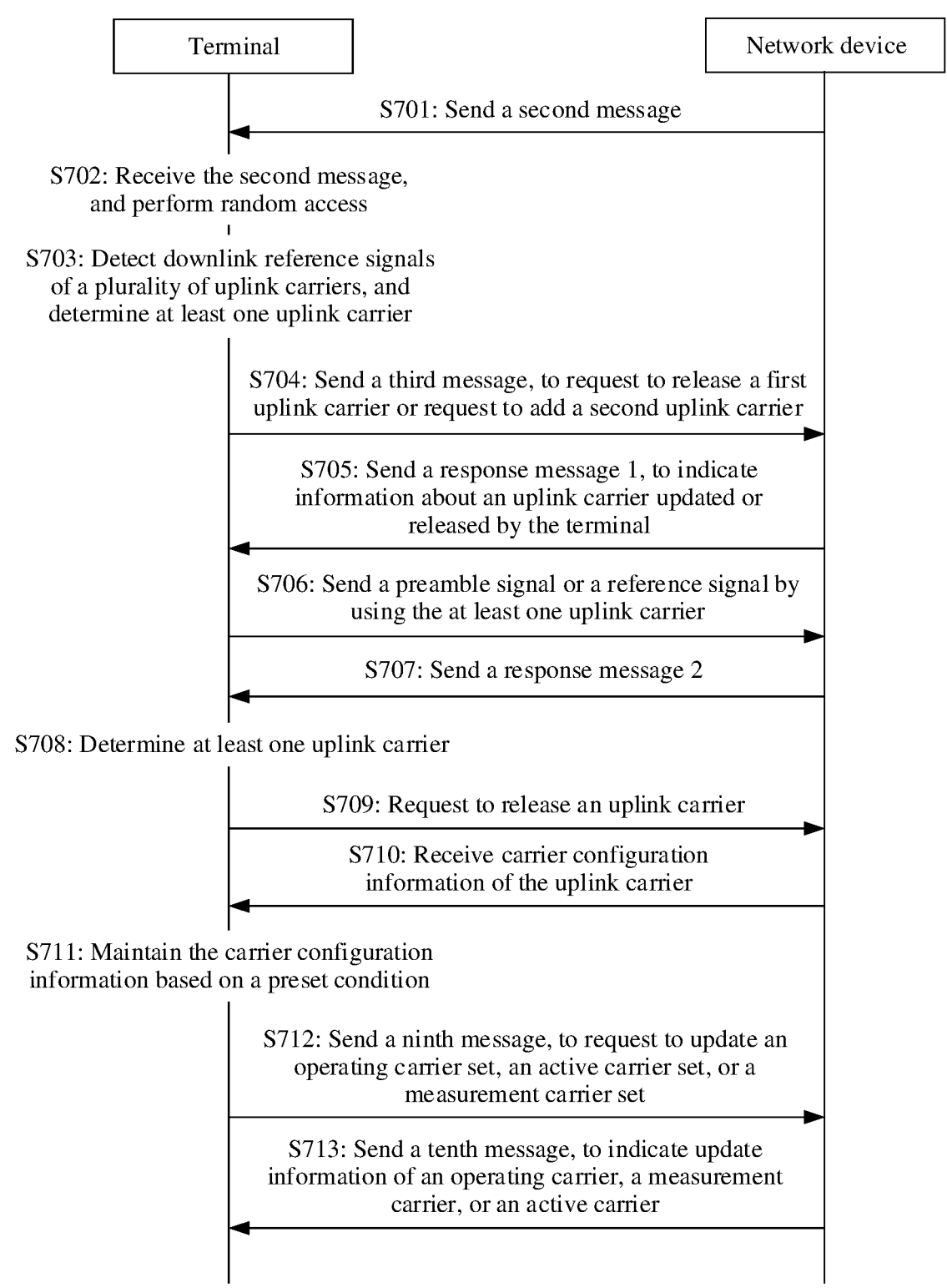
FIG. 7 is a flowchart of another communication method according to an embodiment of this application.

In an implementation provided in an embodiment of this application, as shown in FIG. 7, the implementation method specifically includes the following steps.

S701: A network device sends a second message.

S702: A terminal receives the second message, and performs random access.

For example, for a case in which the second message includes Mode 2, that is, a part of resources of an uplink carrier are used for downlink data transmission, the terminal may access, based on configuration information of the second message, a cell corresponding to a first uplink carrier and a first downlink carrier.

Specifically, the terminal may perform random access based on an uplink carrier corresponding to a downlink carrier of the second message or a system message, to access a cell 1. Currently, the terminal changes from an idle mode (idle) or an inactive mode (Inactive) to a connected mode (Connected), and the terminal may perform data transmission with the network device at any time based on a service requirement.

Random access is a process between attempting to access the network device starting from sending a random access preamble sequence by the terminal and establishing a basic signaling connection with the network device. For a specific random access process, refer to a two-step random access process or a four-step random access process in the conventional technology. This is not limited in this application.

The cell 1 may be a cell corresponding to a macro base station or a primary base station, and the cell 1 provides an uplink carrier UL-0 and a downlink carrier DL-0. For example, uplink and downlink carriers of the cell 1 are 700 MHz uplink and downlink carriers, and uplink and downlink data transmission may be performed by using a time division duplex (time division duplex, TDD) technology. The macro uplink carrier and the macro downlink carrier may be configured as an uplink carrier UL-0 and the downlink carrier DL-0 respectively. The terminal may send uplink data, an uplink measurement signal, or the like to the network device by using the uplink carrier UL-0; and receive, by using the downlink carrier DL-0, downlink data, a downlink measurement signal, or the like from the network device.

The terminal in the connected mode may perform data transmission at any time by using configured uplink and downlink carriers. When having a data transmission requirement, the terminal in the idle mode or the inactive mode needs to first establish a connection to the network device, that is, perform data transmission after random access.

TDD is a duplex communication technology in a communication system, and is used to separate a receiving channel and a sending channel, that is, an uplink and a downlink. In the communication system using the TDD mode, a same frequency domain resource is used for the uplink and the downlink, and different time domain resources are used to distinguish between the uplink and the downlink.

In addition, the communication system further includes a frequency division duplex (frequency division duplexing, FDD) communication technology, to separate a receiving channel from a sending channel, that is, an uplink and a downlink. In the communication system using an FDD mode, a same time domain resource is used for the uplink and the downlink, and different frequency domain resources are used to distinguish between the uplink and the downlink. For example, an uplink frequency range is different from a downlink frequency range. For the communication system supporting the FDD mode, the receiving channel and the sending channel are uninterrupted in time, and a frequency band needs to be configured for each of the receiving channel and the sending channel. All 10 subframes of each radio frame may be used for downlink transmission, or may be used for uplink transmission, and uplink and downlink transmission are performed on different frequency bands.

S703: The terminal detects downlink reference signals of a plurality of uplink carriers, and determines at least one uplink carrier.

Specifically, the terminal may detect, based on carrier information provided in the second message sent by the network device, downlink reference signals of a plurality of uplink carriers whose uplink carrier configuration modes are Mode 2.

The terminal determines the at least one uplink carrier depending on determining of the following initial condition for triggering the terminal to select an uplink carrier.

If quality of a downlink reference signal of an uplink carrier UL-1 detected by the terminal is greater than or equal to a threshold 1, the terminal determines that the uplink carrier UL-1 is a candidate uplink carrier.

Alternatively, if signal quality of a current downlink carrier DL-0 detected by the terminal is less than or equal to a threshold, and quality of a downlink reference signal of an uplink carrier UL-2 is greater than a threshold 2, the terminal determines that the uplink carrier UL-2 is a candidate uplink carrier.

The threshold 1 and the threshold 2 that are related to the signal quality of the carriers, and a plurality of thresholds mentioned above are preconfigured, may be set by a person skilled in the art based on parameters such as resource configuration of the network device and signal quality actually received by the terminal, and may be adjusted and updated based on actual handover and carrier selection requirements. This is not specifically limited in this application.

In addition, in a possible implementation, for a case in which the second message includes Mode 1, that is, all resources of an uplink carrier are used for uplink data transmission, for example, the terminal may first access, based on configuration information of the second message, a cell corresponding to a first uplink carrier and a first downlink carrier. The terminal may further send indication information to the network device, to indicate that a current uplink carrier configuration mode of the terminal is Mode 1.

S704: The terminal sends a third message, to request to release the first uplink carrier or request to add a second uplink carrier.

For example, based on the foregoing uplink carrier selection condition, when the terminal determines that the uplink carrier UL-2 meets the foregoing condition and is the candidate uplink carrier, the terminal sends the third message, to request to update or add the uplink carrier UL-2.

In an implementation, the third message may include indication information for requesting to update the second uplink carrier. Alternatively, the third message may further include a carrier index, a carrier identifier, a downlink reference signal identifier, or a carrier frequency corresponding to the at least one uplink carrier, or indication information for requesting to update the second uplink carrier. There may be at least one updated or added uplink carrier.

For example, for the uplink carrier UL-2 that the terminal requests to add, the third message sent by the terminal device may include a carrier index, a carrier identifier, a downlink reference signal identifier, or a carrier frequency of the UL-2, indication information for requesting to update the UL-2, and the like.

In another possible implementation, the terminal may further determine, based on a condition for releasing the uplink carrier, an uplink carrier that meets the condition, and send the third message, to request the network device to release the uplink carrier.

The condition for releasing the uplink carrier may be specifically that at least one of the following conditions. For example, an uplink operating carrier of the current terminal is the first downlink carrier.

1. Quality of the first downlink carrier is less than or equal to a threshold 4.

2. Quality of the first downlink carrier is greater than or equal to a threshold 5, and the quality of the first downlink carrier is less than or equal to a threshold 6.

3. Quality of the first downlink carrier is greater than or equal to the threshold 7.

4. Quality of a downlink signal on the first uplink carrier is greater than or equal to a threshold 8, and the quality of the downlink signal on the first uplink carrier is less than or equal to a threshold 9.

For example, based on the condition for releasing the uplink carrier, when the terminal determines that the uplink carrier UL-1 meets the foregoing condition and needs to release the uplink carrier, the terminal sends the third message, to request to release the uplink carrier UL-1. In this case, the UL-1 may be updated to a measurement carrier or an activated carrier.

In an implementation, the third message may include indication information for requesting to release the second uplink carrier. Alternatively, the third message may further include a carrier index, a carrier identifier, a downlink reference signal identifier, or a carrier frequency corresponding to the at least one uplink carrier, or indication information for requesting to release the second uplink carrier. There may be at least one uplink carrier that the terminal requests to release.

For example, for the uplink carrier UL-1 that the terminal requests to release, the third message sent by the terminal device may include a carrier index, a carrier identifier, a downlink reference signal identifier, or a carrier frequency of the UL-1, indication information for requesting to release the UL-1, and the like.

S705: The network device sends a response message 1 to the terminal, to indicate information about an uplink carrier updated or released by the terminal.

The response message sent by the network device to the terminal indicates a processing result of requesting, by the terminal, to add, update, or release the uplink carrier, or may further include configuration information of the uplink carrier that the terminal requests to add, update, or release.

For example, the response message may include a carrier index (index) of at least one uplink carrier UL CC, a carrier identifier of the uplink carrier UL CC, a downlink reference signal RS identifier ID of the uplink carrier UL CC, a carrier frequency of the uplink carrier, an indication for uplink carrier release, an indication for uplink carrier deactivation, uplink carrier random access configuration information, uplink carrier transmission configuration information, and configuration information that is for sending a reference signal and that is in the uplink carrier.

The reference signal configuration information of the uplink carrier may include at least one of the following: a reference signal identifier, or a time-frequency resource configuration for sending a reference signal.

S706: The terminal sends a preamble signal or a reference signal by using the at least one uplink carrier.

The terminal may send the preamble signal or the reference signal to the network device by using the at least one uplink carrier based on uplink carrier information configured in the response message 1.

For example, the network device provides, by using response message 1, configuration information of three uplink carriers: the UL-1, the UL-2, and UL-3. The terminal may obtain resource configuration information of the uplink carrier based on the uplink carrier information provided in the response message 1. Specifically, the resource configuration information of the uplink carrier may be a random access resource configuration, a reference signal resource configuration, or an uplink carrier transmission resource configuration. The terminal sends a preamble signal, that is, a random access preamble (preamble), to the UL-1, the UL-2, and the UL-3 in turn, to perform random access. Alternatively, the terminal may alternatively send an uplink reference signal to the UL-1, the UL-2, and the UL-3 in turn, to perform uplink channel estimation or uplink channel quality measurement.

S707: The network device sends a response message 2 to the terminal.

The response message 2 may include a random access response (Random Access Response, RAR) message.

Specifically, the network device may determine parameter information such as a TA value, a power headroom, and a path loss of the terminal on each uplink carrier based on the preamble or the reference signal received from the terminal.

The network device may feed back the foregoing parameter information corresponding to each uplink carrier to the terminal. Alternatively, after performing evaluation based on the foregoing parameter, the network device may select the foregoing parameter of at least one optimal uplink carrier and feed back the foregoing parameter to the terminal, so that the terminal determines, based on the foregoing parameter, the optimal uplink carrier as an uplink carrier that actually sends data.

In this case, the response message 2 may include at least one of the following: uplink carrier information, a TA value used by the terminal to perform uplink data transmission on the uplink carrier, a power headroom, or a path loss.

The path loss is also referred to as a propagation loss, and is a power loss generated by an electrical signal in a space propagation process. Generally, the path loss is related to a distance between a sending device and a receiving device. The power headroom refers to a difference between a maximum transmission power allowed by the terminal and a currently evaluated PUSCH transmission power, and may be used to indicate a transmit power that can be used by the terminal in addition to a transmission power currently used for uplink physical shared channel transmission.

S708: The terminal determines at least one uplink carrier.

The terminal may determine at least one optimal uplink carrier based on the received response message 2.

Specifically, that the terminal determines an uplink carrier may be: The terminal determines the uplink carrier for performing uplink data transmission, which is also referred to as an operating carrier. Alternatively, the terminal determines an active uplink carrier, which is an activated carrier for short. Alternatively, the terminal determines an uplink carrier for measurement, which is a measurement carrier for short.

The operating carrier is a carrier on which the terminal actually sends uplink information or a carrier on which the terminal actually sends uplink data, and there may be at least one operating carrier.

The activated carrier is a carrier that supports the terminal to concurrently send data. That is, the terminal may select a plurality of activated carriers at any time based on a service transmission requirement to concurrently transmit uplink data.

The measurement carrier means that the terminal may send uplink reference information by using the uplink carrier, and the network device performs measurement and feeds back measurement information; in this way, the terminal determines whether the uplink carrier is suitable for performing uplink data transmission.

In an implementation, that the terminal determines an operating carrier may specifically include: The terminal may associate the determined at least one carrier with at least one downlink carrier. That is, the terminal may associate one or more uplink carriers with one downlink carrier, or associate an uplink carrier with one or more downlink carriers, or associate a plurality of uplink carriers with a plurality of downlink carriers.

For example, the terminal determines that the UL-1 and the DL-0 are associated carriers, or determines that the UL-1, the UL-2, and the DL-0 are associated carriers.

In another possible implementation, the terminal may further determine a cell configuration based on the determined at least one carrier, to perform cell update or addition.

It should be noted that the cell configuration in this embodiment of this application may be at least one uplink carrier, may be a case in which the at least one uplink carrier and one downlink carrier are associated carriers, or may be a case in which the at least one uplink carrier and the at least one downlink carrier are associated carriers, or the like. An uplink carrier and a downlink carrier that correspond to a cell may be flexibly configured between the network device and the terminal based on a use requirement, to improve transmission performance of a communication system.

In this case, step S708 may further include: The terminal sends a fifth message to the network device, to indicate to determine updated configuration information of a cell, or indicate binding between the at least one uplink carrier and the at least one downlink carrier.

Alternatively, the foregoing step S708 may further include: The network device sends a fifth message to the terminal, to indicate to determine updated configuration information of a cell, or indicate binding between the at least one uplink carrier and the at least one downlink carrier.

In an implementation, the foregoing implementation of this application may further include the following step:

S709: The terminal requests the network device to release an uplink carrier.

The releasing an uplink carrier may be specifically: configuring the operating uplink carrier as an activated carrier or a measurement carrier, or configuring the uplink carrier as a deactivated carrier.

Specifically, after determining the optimal uplink carrier based on the foregoing steps, the terminal may automatically release an uplink carrier in use, that is, automatically configure the uplink carrier as the activated carrier, the measurement carrier, or the like.

Alternatively, the terminal may receive an uplink carrier release message from the network device.

Alternatively, the terminal may send a request message to the network device to request to release an uplink carrier. The network device updates configuration information of the uplink carrier based on the request message, and feeds back a response message to the terminal. For example, the response message indicates to agree to release the uplink carrier or indicates that the uplink carrier is successfully released.

Alternatively, the terminal may determine, based on whether signal quality of a detected downlink reference signal of an uplink carrier meets a preset condition, to release the uplink carrier. Specifically, step S704 includes several possible determining conditions for releasing the uplink carrier, and details are not described herein.

For example, for the terminal, operating carriers currently used for uplink transmission are UL-1 (4.9 GHz) and UL-0 (700 MHz), and operating carriers used for downlink transmission are DL-0 (700 MHz). The terminal may determine, based on the foregoing process, to release the uplink carrier UL-0. In this case, the terminal performs the foregoing several possible uplink carrier release operations, and updates current cell configurations to the DL-0 (700 MHz) and the UL-1 (4.9 GHz), to perform downlink/uplink transmission respectively.

In an implementation, the foregoing implementation of this application may further include the following steps:

S710: The terminal receives carrier configuration information of the uplink carrier.

The carrier configuration information may include configuration information of M measurement carriers, configuration information of L activated carriers, and/or configuration information of m operating carriers. M, L, and m are positive integers, and $m \leq M \leq L$. The carrier configuration information may include a carrier index, a carrier frequency, a carrier identifier, or the like of at least one uplink carrier.

In addition, the carrier configuration information of the uplink carrier may specifically include at least one of the following configurations: a measurement set configuration of the uplink carrier, an active set configuration of the uplink carrier, or an operating set configuration of the uplink carrier.

Further, the carrier configuration information may further include at least one of the following conditions: a determining condition for updating a measurement carrier, a determining condition for updating an activated carrier, or a determining condition for updating an operating carrier.

In this case, the terminal may maintain and update the carrier configuration information based on the carrier configuration information, the determining condition for updating an uplink carrier, quality of detected uplink measurement signals and detected downlink reference signals of a plurality of uplink carriers, and the like.

In an implementation, before step S710, the implementation method may further include: The terminal sends configuration information of at least one uplink carrier to the network device.

The configuration information of the at least one uplink carrier may include quality of downlink reference signals of a plurality of uplink carriers, and configuration information of a measurement set or an active set of a plurality of candidate uplink carriers. The configuration information of the plurality of candidate uplink carriers may include configuration information such as a carrier frequency, a carrier index, or a carrier identifier.

A downlink signal measurement result of the uplink carrier may include a downlink reference signal received power (Reference Signal Received Power, RSRP), a received signal strength indicator (Received Signal Strength Indicator, RSSI), and reference signal received quality (Reference Signal Received Quality, RSRQ).

The RSRP can be used to reflect path loss strength of a current channel, and can be used for uplink carrier coverage measurement, cell selection/reselection, and handover. The RSSI may be used to reflect received signal strength and an interference degree of the current channel, including signals of a serving cell and a non-serving cell, interference from a neighboring channel, and thermal noise in a system. The RSRQ may be used to reflect received quality of a downlink reference signal, and may be specifically a signal-to-noise ratio, an interference level, and the like for current channel quality.

In another implementation, step S710 may also include at least one of the following cases. To be specific, the terminal receives different configuration messages from the network device to update a measurement carrier set, an activated carrier set, or an operating carrier set.

The following steps may be included:

(1) The terminal receives a sixth message, where the sixth message includes a configuration of a measurement carrier.

(2) The terminal receives a seventh message, where the seventh message includes a configuration of an activated carrier.

(3) The terminal receives an eighth message, where the eighth message includes a configuration of operating carrier.

The measurement carrier is a carrier for uplink signal measurement or downlink signal measurement, the activated carrier is a carrier that can support the terminal to concurrently send uplink data, and the operating carrier is a carrier that the terminal actually sends uplink information or sends uplink data.

Similarly, the sixth message, the seventh message, and the eighth message may include a carrier index, a carrier frequency, a carrier identifier, or the like of at least one uplink carrier. Further, the method may further include at least one of the following conditions: a determining condition for updating the measurement carrier, a determining condition for updating the activated carrier, or a determining condition for updating the operating carrier.

In the present invention, the uplink signal may be an uplink reference signal, an uplink measurement signal, or the like. The downlink signal may be a downlink reference signal, a downlink measurement signal, or the like.

Specifically, the configuration of the measurement carrier includes at least one of the following: a carrier frequency, a carrier index, a carrier identifier, a reference signal identifier, a cell radio network temporary identifier, a sequence identifier corresponding to an uplink signal, a sequence identifier corresponding to the uplink signal, or a resource identifier corresponding to the uplink signal.

Specifically, the configuration of the activated carrier includes at least one of the following: a carrier frequency, a carrier index, a carrier identifier, a reference signal identifier, a cell radio network temporary identifier, a sequence identifier corresponding to an uplink signal, a sequence identifier corresponding to the uplink signal, or a resource identifier corresponding to the uplink signal.

Specifically, the configuration of the operating carrier includes at least one of the following: a carrier frequency, a carrier index, a carrier identifier, a reference signal identifier, a cell radio network temporary identifier, a sequence identifier corresponding to an uplink signal, a sequence identifier corresponding to the uplink signal, a resource identifier corresponding to the uplink signal, or an activated carrier bitmap.

In an implementation, after step S710, the terminal may specifically update configuration information of the activated carrier by performing at least one of the following operations on the activated carrier:

(1) The terminal may send a preamble signal or an uplink signal to a plurality of activated carriers one by one based on the received configuration information of the activated carrier; performing uplink synchronization with activated carriers one by one; performing uplink power control adjustment with activated carriers one by one; or performing random access by using activated carriers one by one, to implement uplink synchronization, uplink power control adjustment, or the like.

Specifically, the terminal updates the carrier configuration information of the uplink carrier based on a detected downlink reference signal of at least one uplink carrier. The terminal receives a signal quality feedback from the network device for each uplink reference signal, or the terminal receives indication information indicating that the network device switches an uplink operating carrier, to determine the uplink operating carrier, and switch the uplink operating carrier or add the uplink operating carrier to the third uplink carrier.

When the terminal measures signal quality of a downlink reference signal of a DL slot, the terminal may select an uplink carrier that meets an activation condition, to activate the uplink carrier.

For an uplink carrier that needs to be activated, if the terminal determines that TAGs of the uplink carrier and an uplink carrier on which random access has been performed are different, the terminal needs to perform random access by using the uplink carrier; or if the terminal determines that TAGs of the uplink carrier and an uplink carrier on which random access has been performed are same, the terminal directly obtains a TA value of the uplink carrier without performing random access by using the uplink carrier.

(2) For an uplink carrier in an operating carrier set, the terminal may flexibly select any operating carrier based on a current uplink service requirement to perform uplink data transmission. For example, the terminal may determine an uplink operating carrier UL-3 based on a maximum supportable quantity of uplink concurrent transmission carriers (that is, a maximum concurrent transmission capability of an uplink operating carrier), and switch the third uplink carrier UL-3 to an uplink operating carrier, add configuration information of the uplink carrier to the operating carrier set.

In addition, for an uplink carrier that is in the measurement carrier set and that is in Mode 1, that is, for uplink transmission only, the terminal may send a reference signal by using the uplink carrier, and determine, based on response information, whether to correspondingly update carrier configuration information. For an uplink carrier in Mode 2, that is, a part of resources of the uplink carrier are used for downlink transmission, the terminal may determine, based on quality of a detected downlink reference signal of the uplink carrier, whether to use the uplink carrier to send a reference signal or perform random access, and determine, based on response information, whether to correspondingly update carrier configuration information.

S711: The terminal maintains the carrier configuration information based on a preset condition.

Specifically, the terminal may maintain and update configuration information of the measurement carrier set, the activated carrier set, or the operating carrier set, which may be specifically implemented in the following manners.

1. For a detected downlink reference signal of at least one uplink carrier, the terminal activates the measurement carrier if determining that quality of the downlink reference signal corresponding to the measurement carrier is greater than or equal to a threshold 10, or the terminal deactivates the measurement carrier if determining that quality of the downlink reference signal corresponding to the measurement carrier is less than or equal to a threshold 13.

2. For a detected downlink reference signal of at least one uplink carrier, if determining that quality of the downlink reference signal corresponding to the activated carrier is greater than or equal to a threshold 11, the terminal switches the activated carrier to an operating carrier, to perform uplink data transmission; or if determining that quality of the downlink reference signal corresponding to the activated carrier is less than or equal to a threshold 14, the terminal switches the activated carrier to a measurement carrier, or still maintains the activated carrier as the activated carrier.

3. For a detected downlink reference signal of at least one uplink carrier, if determining that quality of the downlink reference signal corresponding to the operating carrier is less than or equal to a threshold 12, the terminal sends a message for requesting to switch the operating carrier, and switches the operating carrier to an activated carrier or a measurement carrier; or if determining that quality of the downlink reference signal corresponding to the operating carrier is greater than or equal to a threshold 15, the terminal still maintains the operating carrier as the operating carrier.

In an implementation, this embodiment of this application may further include the following steps.

S712: The terminal sends a ninth message to the network device, to request to update the operating carrier set, the activated carrier set, or the measurement carrier set.

(1) For an operating carrier, the terminal may send the ninth message to the network device when the terminal determines, based on the foregoing determining condition for switching an operating carrier, that the current operating carrier needs to be switched, to request to configure a new operating carrier.

The ninth message may include the operating carrier that the terminal determines to switch or a candidate operating carrier that the terminal is to add.

(2) For an activated carrier, the terminal may send the ninth message to the network device, to request to activate the operating carrier.

The ninth message may further include information about a configuration of an uplink carrier that the terminal requests to deactivate or release, or information about an activated carrier that the terminal requests to add.

(3) For a measurement carrier, the terminal may send the ninth message to the network device, to request to add a new measurement carrier.

The ninth message may further include information about a measurement carrier that the terminal requests to delete or information about a measurement carrier that the terminal requests to add.

S713: The network device sends a tenth message to the terminal, to indicate update information of an operating carrier, a measurement carrier, or an activated carrier.

The tenth message may include resource configuration information of the uplink carrier. For updated configuration information of the measurement carrier or the activated carrier, the configuration information may be carried in a higher layer message, for example, a medium access control (Medium Access Control, MAC) message or a radio resource control (Radio Resource Control, RRC) message.

The RRC message or the MAC message indicates to update configuration information of at least one measurement carrier or at least one activated carrier. For example, the network device may provide configurations of M measurement carriers for the terminal by using the RRC message, which may include UL-1, UL-2, UL-3, UL-4, and UL-5.

For updated configuration information of the operating carrier, the configuration message may be carried in a downlink control information (Downlink Control Information, DCI) message. Specifically, the DCI message may include configuration information of at least one activated carrier, and indicates to switch the activated carrier to an operating carrier. For example, the terminal may select, based on the DCI message, m uplink carriers from configured L activated carriers as operating carriers, to send uplink data or perform uplink signal transmission.

In an implementation, after receiving the update information of the operating carrier, the measurement carrier, or the activated carrier configured by the network device, the terminal may continue to send a preamble signal or a reference signal on a candidate activated carrier or operating carrier, perform random access or implement synchronization, and update or add the activated carrier. In this case, the terminal may continue to select a current optimal uplink carrier and switch the current optimal uplink carrier to an operating carrier for uplink transmission, and determine an associated carrier or a cell based on a determined new uplink carrier. In other words, operations such as steps S706 to S709 and S710 to S713 may be cyclically repeated based on an actual situation, to flexibly configure and update an uplink carrier.

In the foregoing implementation of this application, the terminal and the network device exchange a series of information, to determine an initial uplink carrier of the terminal, determine a cell, update a carrier resource based on reconfiguration of the uplink carrier, and further determine, based on updated candidate uplink carriers (the measurement carrier and the activated carrier), to switch or add an operating carrier. In this way, a plurality of optional uplink carrier resources can be continuously configured for the terminal, to implement flexible configuration of the uplink carrier, effectively improve coverage extension of an uplink signal, and effectively increase a capacity of an uplink service.

It should be noted that, with reference to different deployment architectures of the foregoing two communication systems in FIG. 3 and FIG. 4, the foregoing network device may be the first network device in FIG. 3, that is, in the co-site case. The foregoing network device may also be the first network device and the second network device in FIG. 4, that is, in the non co-site case. There may be one primary base station, for example, the first network device. The primary base station may be, for example, a macro base station. There may be at least one secondary base station, for example, the second network device, to provide at least one candidate uplink carrier.

The terminal may select at least one uplink carrier provided for uplink data transmission by the second network device, and the at least one uplink carrier may be associated with the downlink carrier provided by the first network device, to perform downlink data transmission of the terminal. Because a link between the first network device and the second network device is considered as an ideal backhaul link, uplink data between the second network device and the terminal may be backhauled to the first network device via the backhaul link. In this way, interaction between the terminal and the network device in the foregoing implementation may specifically include interaction between the first network device and the terminal and interaction between the second network device and the terminal may be included.

In another implementation provided in this embodiment of this application, for a case in which the terminal can detect downlink reference signals DL slots of a plurality of uplink carriers, that is, the second message includes Mode 2, the terminal may directly select an optimal uplink carrier from an idle mode (idle) or an inactive mode (inactive) for access. In other words, the terminal may directly trigger an initial selection condition of an uplink carrier based on the plurality of detected uplink carriers, and select an uplink carrier with a high signal quality priority based on downlink reference signal quality, to perform access. For example, the terminal may directly access a cell 2 corresponding to the UL-1 and the DL-0 from the idle mode or the inactive mode, so that the terminal does not need to: access the cell 1 corresponding to the UL-0 and the DL-0 first, then determine the uplink carrier UL-1 with a high signal quality priority from a plurality of candidate uplink carriers, and then release the uplink carrier UL-0 corresponding to the cell 1. Therefore, uplink carrier switching flexibility can be further improved, and performance of a communication system can be improved.

Figure 8:
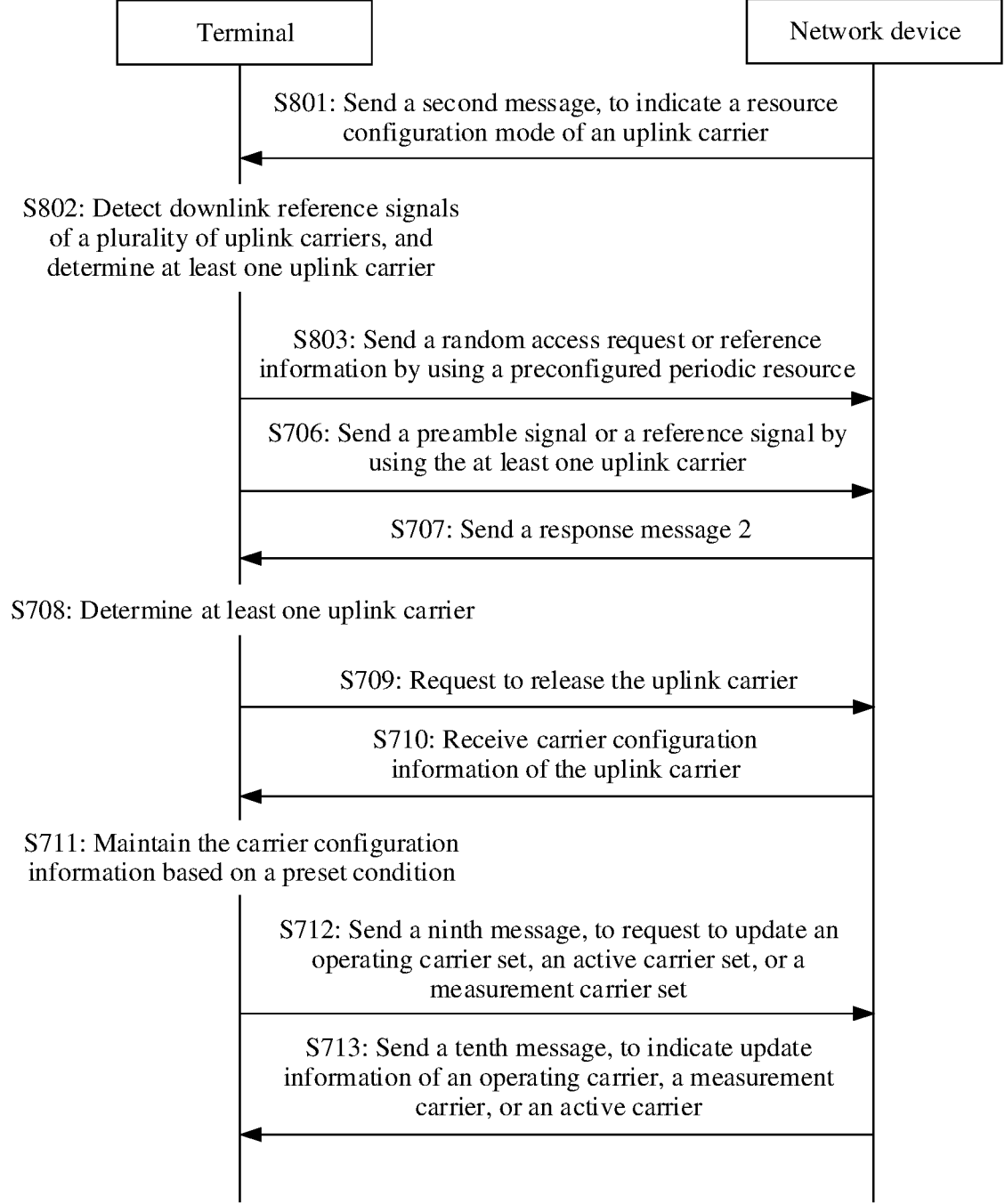
FIG. 8 is a flowchart of another communication method according to an embodiment of this application.

Specifically, as shown in FIG. 8, the method may include the following steps.

S801: A network device sends a second message, to indicate a resource configuration mode of an uplink carrier.

The resource configuration mode of the uplink carrier may include at least one of Mode 1, Mode 2, or Mode 3. The second message may further include at least one of the following: a carrier frequency, a carrier index, a carrier identifier of at least one uplink carrier, a random access configuration parameter, or timing advance information. The second message may be a system message, or may be a dedicated message, for example, an RRC message.

In addition, a terminal in a connected mode may receive a periodic uplink resource configured by the network device. The periodic uplink resource may specifically include a CG resource or a preconfigured uplink resource (Preconfigure Uplink Resource, PUR), and is used by the terminal to select an uplink carrier when the terminal switches to an idle mode or an inactive mode. The terminal may directly send uplink data by using the CG resource or the PUR resource.

The PUR resource is a preconfigured periodic resource used by the terminal to send the uplink data in the idle mode.

S802: The terminal detects downlink reference signals of a plurality of uplink carriers, and determines at least one uplink carrier.

Specifically, the terminal may detect, based on carrier information provided in the second message sent by the network device, downlink reference signals of a plurality of uplink carriers whose uplink carrier configuration modes are Mode 2.

The terminal may determine the at least one uplink carrier depending on determining of the foregoing initial condition for triggering the terminal to select an uplink carrier. Details are not described herein again. For example, the uplink carrier determined by the terminal is a third uplink carrier UL-3.

S803: The terminal sends a random access request or reference information by using the preconfigured periodic resource.

Subsequently, the network device calculates, based on a preamble signal or a reference signal from the terminal, a TA value, a power headroom, or a path loss for performing uplink transmission by the terminal by using each uplink carrier, and feeds back a response message to the terminal. The terminal receives a response message from the network device; determines an optimal uplink carrier based on a TA value, a power headroom, a path loss, or the like of at least one uplink carrier included in the response message; and determines a cell based on the determined at least one uplink carrier.

A subsequent implementation process is basically the same as that in the foregoing embodiment. For details, refer to content after step S706. Details are not described herein again.

In the foregoing implementation of this application, the terminal may determine the at least one uplink carrier based on the detected downlink reference signal of the uplink carrier, and directly perform random access by using the preconfigured periodic uplink resource. In this way, the terminal can directly access the preferred uplink carrier or cell in the idle mode or the inactive mode, a process of performing access before switching is eliminated, configuration of the uplink carrier is more flexible and convenient, and performance of a communication system is effectively improved.

This application further provides a communication method. A network device may configure at least one uplink carrier and at least one downlink carrier in a first frequency band and/or a second frequency band as a cell based on the first frequency band and/or the second frequency band that are or is reported by a terminal device. In this way, the network device may flexibly configure an uplink carrier and a downlink carrier or a cell for the terminal device based on a capability of an available carrier of the terminal device, to improve transmission performance of a communication system.

Specifically, the method may include the following steps.

Step 1: The terminal device sends indication information of the first frequency band and the second frequency band to the network device.

The indication information sent by the terminal device to the network device is actually information about a frequency band supported by the terminal device, that is, indicates that the terminal device supports any carrier in the first frequency band and/or the second frequency band or an uplink-downlink carrier combination including a plurality of carriers in the first frequency band and/or the second frequency band.

That the terminal device sends indication information of the first frequency band and the second frequency band to the network device may also be understood as: The terminal device sends capability information of the supported first frequency band and second frequency band to the network device.

It should be noted that the first frequency band and the second frequency band are two different frequency bands, center frequency channel numbers corresponding to the first frequency band and the second frequency band are different, and frequency bandwidths may also be different correspondingly.

Step 2: The network device uses at least one uplink carrier and at least one downlink carrier in the first frequency band and/or the second frequency band as a cell of the terminal device.

In an implementation, the network device may configure or use any downlink carrier in the first frequency band and any uplink carrier in the second frequency band as a cell, to perform data transmission between the network device and the terminal device.

In other words, the network device may use any carrier in the first frequency band as a downlink carrier corresponding to the terminal device, and use any carrier in the second frequency band as an uplink carrier corresponding to the terminal device. In this case, the uplink carrier and the uplink carrier are used as a cell, to perform data transmission between the network device and the terminal device.

Alternatively, in another implementation, the network device may configure any uplink carrier in the first frequency band and any downlink carrier in the second frequency band as a cell.

Alternatively, in another implementation, the network device may configure at least one uplink carrier in the first frequency band and at least one downlink carrier in the second frequency band as a cell.

In other words, the network device may use any one or more carriers in the first frequency band as the uplink carrier corresponding to the terminal device, and use any one or more carriers in the second frequency band as the downlink carrier corresponding to the terminal device. In this case, the uplink carrier and the uplink carrier are used as the cell.

Alternatively, in another implementation, the network device may configure at least one downlink carrier in the first frequency band and at least one uplink carrier in the second frequency band as a cell.

Alternatively, in another implementation, the network device may configure at least one uplink carrier and at least one downlink carrier in the first frequency band as a cell.

In other words, the network device may use any one or more carriers in the first frequency band as the uplink carrier corresponding to the terminal device, and use any one or more carriers in other carriers in the first frequency band as the downlink carrier corresponding to the terminal device. In this case, the uplink carrier and the uplink carrier are used as the cell.

Alternatively, in another implementation, the network device may configure at least one uplink carrier and at least one downlink carrier in the second frequency band as a cell.

In the foregoing implementation, the network device may flexibly configure an uplink carrier and a downlink carrier or a communication cell for the terminal device based on the capability of the available carrier of the terminal device, to improve transmission performance of the communication system.

It may be understood that, to implement the foregoing functions, the terminal or the network device includes corresponding hardware structures and/or software modules for performing the functions. A person skilled in the art should easily be aware that, in combination with units and algorithm operations of the examples described in embodiments in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the terminal or the network device may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into the modules is an example, and is merely a logical function division. In actual implementation, another division manner may be used.

Figure 9:
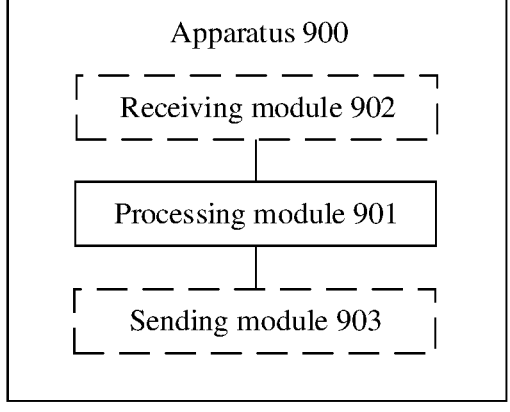
FIG. 9 is a schematic diagram of a communication apparatus according to an embodiment of this application.
Figure 10:
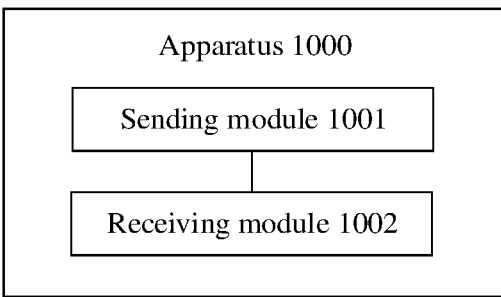
FIG. 10 is a schematic diagram of another communication apparatus according to an embodiment of this application.

For example, when each functional module is obtained through division in an integration manner, FIG. 9 and FIG. 10 are schematic diagrams of a structure of a communication apparatus. An apparatus 900 may be a chip or a system on chip in a terminal, or another combined component, another component, or the like that can implement a function of the foregoing terminal. The apparatus 900 may be configured to perform the function of the terminal in the foregoing embodiments. An apparatus 1000 may be a chip or a system on chip in a network device, or another combined component, another component, or the like that can implement a function of the foregoing network device. The apparatus 1000 may be configured to perform the function of the network device in the foregoing embodiments.

An embodiment of this application further provides an information indication apparatus, to implement an action performed by the foregoing terminal in the foregoing embodiments. As shown in FIG. 9, the apparatus 900 includes a processing module 901.

The processing module 901 is configured to determine a first uplink carrier. The processing module 901 is further configured to determine a first cell and/or a first downlink carrier based on the first uplink carrier.

In a possible design manner, the processing module 901 is specifically configured to: when the first uplink carrier is at least one uplink carrier, determine that each of the at least one uplink carrier is a cell; when the first uplink carrier is at least one uplink carrier, determine that the at least one uplink carrier is a cell; or when the first uplink carrier is at least one uplink carrier, determine that the at least one uplink carrier and the first downlink carrier are a cell; determine that the first uplink carrier and the first downlink carrier are associated carriers, where the first uplink carrier is used for uplink communication, and the first downlink carrier is used for downlink communication; and determine that the first uplink carrier and the first downlink carrier are associated carriers, where the first uplink carrier is used for uplink communication, the first downlink carrier is used for downlink communication, and a second downlink carrier corresponding to the first uplink carrier is configured for downlink measurement.

In a possible design manner, the apparatus 900 may further include: a receiving module 902, configured to receive a first message from a network device. The first message indicates the first uplink carrier or a channel parameter of the first uplink carrier. In this case, the processing module 901 is specifically further configured to: determine the first uplink carrier based on the first message, determine the first uplink carrier based on a downlink measurement signal received on the first uplink carrier, or determine the first uplink carrier based on a downlink measurement signal received on the second downlink carrier corresponding to the first uplink carrier.

In a possible design manner, the processing module 901 is specifically further configured to determine the first uplink carrier when at least one of the following conditions is met: channel quality of a third downlink carrier is less than or equal to a first threshold, and the third downlink carrier is used for downlink communication before the first uplink carrier is determined; a third downlink carrier is configured to correspond to a second uplink carrier and is used for downlink measurement before the first uplink carrier is determined, and the second uplink carrier is used for uplink communication before the first uplink carrier is determined; channel quality of the downlink measurement signal on the first uplink carrier is greater than or equal to a second threshold; or channel quality of the second downlink carrier is greater than or equal to a third threshold, and the second downlink carrier is configured to correspond to the first uplink carrier and is currently used for downlink measurement.

In a possible design manner, the receiving module 902 is further configured to receive a second message. The second message indicates that all resources of the first uplink carrier are used for uplink data transmission, the second message indicates that a part of resources of the first uplink carrier are used for downlink transmission, or the second message indicates that the first uplink carrier and the first downlink carrier are associated carriers.

In a possible design manner, the apparatus 900 further includes a sending module 903. The sending module 903 is configured to send a third message when a first condition is met. The third message is used to request to release the second uplink carrier, and the second uplink carrier is used for uplink communication before the first uplink carrier is determined. The first condition includes at least one of the following: a quantity of uplink carriers available for uplink communication is greater than or equal to a fourth threshold; the channel quality of the third downlink carrier is less than or equal to a fifth threshold, and the third downlink carrier is used for downlink communication before the first uplink carrier is determined; the third downlink carrier is configured to correspond to the second uplink carrier and is used for downlink measurement before the first uplink carrier is determined; channel quality of the first downlink carrier is greater than or equal to a sixth threshold; the channel quality of the downlink measurement signal on the first uplink carrier is greater than or equal to an eighth threshold; or the channel quality of the second downlink carrier is greater than or equal to a ninth threshold, and the second downlink carrier is configured to correspond to the first uplink carrier and is currently used for downlink measurement.

In a possible design manner, the processing module 901 is specifically further configured to: determine the first uplink carrier as an uplink carrier for uplink measurement; determine the first uplink carrier as an uplink carrier available for uplink communication; or determine the first uplink carrier as an uplink carrier for uplink communication.

An embodiment of this application provides another communication apparatus, to implement actions performed by the network device in embodiments. As shown in FIG. 10, the communication apparatus 1000 includes a sending module 1001 and a receiving module 1002.

The sending module 1001 is configured to send a first message. The first message indicates at least one uplink carrier or a channel parameter of at least one uplink carrier. The receiving module is configured to receive a third message from a terminal. The third message is used to request to add or activate at least one first uplink carrier, and the first uplink carrier is a carrier that is used for uplink transmission and that is determined by the terminal from the at least one uplink carrier.

In a possible design manner, the sending module 1001 is further configured to send a second message. The second message indicates that all resources of the first uplink carrier are used for uplink transmission, the second message indicates that a part of resources of the first uplink carrier are used for downlink transmission, or the second message indicates that the first uplink carrier and a first downlink carrier are associated carriers.

In a possible design manner, the receiving module 1002 is further configured to receive the third message from the terminal. The third message is used to request to release a second uplink carrier, and the second uplink carrier is used for uplink communication with the terminal.

In a possible design manner, the sending module 1001 is further configured to send response information to the terminal. The response information indicates to release a second uplink carrier or add the first uplink carrier.

In a possible design manner, the receiving module 1002 is further configured to receive a fifth message from the terminal. The fifth message indicates at least one of the following: determining the first uplink carrier as an uplink carrier for uplink measurement; determining the first uplink carrier as an uplink carrier available for uplink communication; or determining the first uplink carrier as an uplink carrier for uplink communication.

It may be understood that when the foregoing apparatus is an electronic device, the sending module may be a transmitter, and may include an antenna, a radio frequency circuit, and the like, and the processing module may be a processor, for example, a baseband chip. When the apparatus is a component having a function of the foregoing terminal or network device, the sending module may be a radio frequency unit, and the processing module may be a processor. When the apparatus is a chip system, the sending module may be an output interface of the chip system, and the processing module may be a processor of the chip system, for example, a central processing unit (central processing unit, CPU).

It should be noted that for a specific execution process and the embodiment of the foregoing apparatus 900, refer to the steps performed by the terminal and related descriptions in the foregoing method embodiments. For a specific execution process and the embodiment of the foregoing apparatus 1000, refer to the steps performed by the network device and related descriptions in the foregoing method embodiments. For resolved technical problems and technical effects of the apparatus 900 and the apparatus 1000, refer to the content in the foregoing embodiments. Details are not described herein again.

In this embodiment, the communication apparatus is presented in a form of the functional modules obtained through division in an integration manner. The "module" herein may be a specific circuit, a processor and a memory that execute one or more software or firmware programs, an integrated logic circuit, and/or another component that can provide the foregoing functions. In a simple embodiment, a person skilled in the art may figure out that the communication apparatus may be in a form shown in FIG. 2.

For example, functions/implementation processes of the processing module in FIG. 9 or FIG. 10 may be implemented by the processor 201 in FIG. 2 by invoking the computer program instructions stored in the memory 204. For example, functions/implementation processes of the receiving module 902 and the sending module 903 in FIG. 9 may be implemented by using the communication interface in FIG. 2, and functions/implementation processes of the processing module 901 may be implemented by the processor 201 in FIG. 2 by invoking the computer-executable instructions stored in the memory 204. Functions/implementation processes of the sending module 1001 and the receiving module 1002 in FIG. 10 may be implemented by the processor 201 in FIG. 2 by invoking the communication interface 203.

An example embodiment further provides a computer-readable storage medium including instructions. The instructions may be executed by the processor 201 or 207 of the communication apparatus 200 to perform the information indication method in the foregoing embodiments. Therefore, for technical effects that can be achieved by the computer-readable storage medium, refer to the foregoing method embodiments. Details are not described herein again.

All or a part of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus.

A person skilled in the art can easily figure out another implementation solution of this application after considering the specification and practicing the present invention that is disclosed herein. This application is intended to cover any variations, functions, or adaptive changes of this application. These variations, functions, or adaptive changes comply with general principles of this application, and include common knowledge or a commonly used technical means in the technical field that is not disclosed in this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, wherein the method comprises:
    determining a first uplink carrier in response to a first condition being met, wherein the first condition comprises at least one of the following:
        channel quality of a third downlink carrier being less than or equal to a threshold K1, and the third downlink carrier is useable for downlink communication before the first uplink carrier is determined;
        channel quality of a downlink signal on the first uplink carrier is greater than or equal to a threshold K2; or
        channel quality of the second downlink carrier is greater than or equal to a threshold K3, and the second downlink carrier is configured to be bound to the first uplink carrier to perform the uplink transmission and the downlink transmission and is currently useable for downlink measurement; and
    determining at least one of a first cell or a first downlink carrier based on the first uplink carrier;
    wherein the first uplink carrier is useable for uplink communication, and the first downlink carrier is useable for downlink communication; and
    wherein the determining the first cell comprises:
        determining that the first uplink carrier is the first cell;
        determining that the first uplink carrier and at least one uplink carrier are a cell;
        determining that the first uplink carrier and the first downlink carrier are the cell; or
        determining that the first uplink carrier, at least one uplink carrier, and the first downlink carrier are the cell; and
    the determining the first downlink carrier comprises:
        determining that the first uplink carrier and the first downlink carrier are associated carriers;
        determining that the first uplink carrier, the at least one uplink carrier, and the first downlink carrier are associated carriers;
        determining that the first cell and a second cell are associated cells, wherein the second cell comprises the first downlink carrier; or
        determining that the first uplink carrier, the at least one uplink carrier, and the first downlink carrier are associated carriers, and determining that a second downlink carrier is useable for downlink measurement, wherein the second downlink carrier is configured to be bound to the first uplink carrier to perform uplink transmission and downlink transmission.

2. The method according to claim 1, wherein before the determining the first uplink carrier, the method further comprises:
    receiving a message 1, wherein the message 1 is useable to indicate support of at least one of the following carrier configurations:
        all resources of an uplink carrier are useable for the uplink transmission;
        a part of resources of the uplink carrier are useable for the downlink transmission; or
        the uplink carrier and a downlink carrier are configured to be bound for the uplink transmission and the downlink transmission.

3. The method according to claim 1, wherein the determining the first uplink carrier comprises:
    determining the first uplink carrier based on a message 2 received from a network device, wherein the message 2 is useable to indicate configuration information of the first uplink carrier;
    determining the first uplink carrier based on a first downlink signal received on the first uplink carrier; or
    determining the first uplink carrier based on a second downlink signal received on the second downlink carrier corresponding to the first uplink carrier.

4. The method according to claim 1, wherein the method further comprises:
    releasing a second uplink carrier, wherein the releasing the second uplink carrier comprises:
        receiving a message 3, wherein the message 3 is useable to indicate release of the second uplink carrier;
        releasing the second uplink carrier in response to a second condition being met; or
        sending a message 4, wherein the message 4 is useable to request release of the second uplink carrier, wherein
    the second uplink carrier is useable for uplink communication before the first uplink carrier is determined; and
    the second condition comprises at least one of the following:
        a quantity of uplink carriers available for uplink communication is greater than or equal to a threshold L1;
        channel quality of the third downlink carrier is less than or equal to a threshold L2, and the third downlink carrier is useable for downlink communication before the first uplink carrier is determined;
        channel quality of the first downlink carrier is greater than or equal to a threshold L3;
        the channel quality of the first downlink carrier is greater than or equal to a threshold L4 and less than or equal to a threshold L5;
        channel quality of the downlink signal on the first uplink carrier is greater than or equal to a threshold L6; or
        channel quality of the second downlink carrier is greater than or equal to a threshold L7, and the second downlink carrier is configured to be bound to the first uplink carrier for the uplink transmission and the downlink transmission, and is currently useable for downlink measurement.

5. The method according to claim 1, wherein the determining the first uplink carrier comprises:

determining the first uplink carrier as is for uplink measurement;

determining the first uplink carrier as is available for uplink transmission; or determining the first uplink carrier as is for uplink transmission.

6. The method according to claim 1, wherein the method further comprises:

adding a third uplink carrier, and updating the first cell;

changing the third uplink carrier to the first uplink carrier, and updating the first cell; or deleting the first uplink carrier, and updating the first cell.

7. The method according to claim 6, wherein the first downlink carrier and the third downlink carrier are a same uplink carrier.

8. The method according to claim 1, wherein before the determining the first uplink carrier, the method further comprises:

receiving a message 1, wherein the message 1 comprises at least one of the following:

a carrier frequency, a carrier index, a carrier identifier of the at least one uplink carrier, a random access configuration parameter, a reference signal configuration, or timing advance group (TAG) information.

9. The method according to claim 1, wherein before the determining the first uplink carrier, the method further comprises:

accessing a network device, wherein an uplink carrier useable by the terminal to communicate with the network device is the second uplink carrier, and a downlink carrier useable by the terminal to communicate with the network device is the third downlink carrier, wherein the third downlink carrier is useable for downlink communication before the first uplink carrier is determined, or the third downlink carrier is useable to receive at least one of a downlink signal or downlink information before the first uplink carrier is determined.

10. An apparatus, comprising:

a non-transitory memory storage comprising non-transitory instructions; and one or more processors coupled to the non-transitory memory storage, wherein the one or more processors is configured to execute the non-transitory instructions to thereby cause the apparatus to:

determine a first uplink carrier in response to a first condition being met, wherein the first condition comprises at least one of the following:

channel quality of a third downlink carrier being less than or equal to a threshold K1, and the third downlink carrier is useable for downlink communication before the first uplink carrier is determined;

channel quality of a downlink signal on the first uplink carrier is greater than or equal to a threshold K2; or channel quality of the second downlink carrier is greater than or equal to a threshold K3, and the second downlink carrier is configured to be bound to the first uplink carrier to perform the uplink transmission and the downlink transmission and is currently useable for downlink measurement; and determine at least one of a first cell or a first downlink carrier based on the first uplink carrier;

wherein the first uplink carrier is useable for uplink communication, and the first downlink carrier is useable for downlink communication; and wherein the one or more processors being configured to execute the non-transitory instructions to thereby cause the apparatus to determine the first cell comprises further causing the apparatus to:

determine that the first uplink carrier is the first cell;

determine that the first uplink carrier and at least one uplink carrier are a cell;

determine that the first uplink carrier and the first downlink carrier are the cell; or determine that the first uplink carrier, at least one uplink carrier, and the first downlink carrier are the cell; and the one or more processors being configured to execute the non-transitory instructions to thereby cause the apparatus to determine the first downlink carrier comprises further causing the apparatus to:

determine that the first uplink carrier and the first downlink carrier are associated carriers;

determine that the first uplink carrier, the at least one uplink carrier, and the first downlink carrier are associated carriers;

determine that the first cell and a second cell are associated cells, wherein the second cell comprises the first downlink carrier; or determine that the first uplink carrier, the at least one uplink carrier, and the first downlink carrier are associated carriers, and determine that a second downlink carrier is useable for downlink measurement, wherein the second downlink carrier is configured to be bound to the first uplink carrier to perform uplink transmission and downlink transmission.

11. The apparatus according to claim 10, wherein before the one or more processors being configured to execute the non-transitory instructions to thereby cause the apparatus to determine the first uplink carrier, the one or more processors being further configured to execute the non-transitory instructions to further cause the apparatus to:

receive a message 1, wherein the message 1 is useable to indicate support of at least one of the following carrier configurations:

all resources of an uplink carrier are useable for the uplink transmission;

a part of resources of the uplink carrier are useable for the downlink transmission; or the uplink carrier and a downlink carrier are configured to be bound for the uplink transmission and the downlink transmission.

12. The apparatus according to claim 10, wherein the one or more processors being configured to execute the non-transitory instructions to thereby cause the apparatus to determine the first uplink carrier comprises further causing the apparatus to:

determine the first uplink carrier based on a message 2 received from a network device, wherein the message 2 is useable to indicate configuration information of the first uplink carrier;

determine the first uplink carrier based on a first downlink signal received on the first uplink carrier; or determine the first uplink carrier based on a second downlink signal received on the second downlink carrier corresponding to the first uplink carrier.

13. The apparatus according to claim 10, wherein the one or more processors is further configured to execute the non-transitory instructions to thereby further cause the apparatus to:

release a second uplink carrier, wherein the one or more processors being configured to execute the non-transitory instructions to thereby cause the apparatus to release the second uplink carrier comprises further causing the apparatus to:

receive a message 3, wherein the message 3 is useable to indicate release of the second uplink carrier;

release the second uplink carrier in response to a second condition being met; or send a message 4, wherein the message 4 is useable to request release of the second uplink carrier, wherein the second uplink carrier is useable for uplink communication before the first uplink carrier is determined; and the second condition comprises at least one of the following:

a quantity of uplink carriers available for uplink communication is greater than or equal to a threshold L1;

channel quality of the third downlink carrier is less than or equal to a threshold L2, and the third downlink carrier is useable for downlink communication before the first uplink carrier is determined;

channel quality of the first downlink carrier is greater than or equal to a threshold L3;

the channel quality of the first downlink carrier is greater than or equal to a threshold L4 and less than or equal to a threshold L5;

channel quality of the downlink signal on the first uplink carrier is greater than or equal to a threshold L6; or channel quality of the second downlink carrier is greater than or equal to a threshold L7, and the second downlink carrier is configured to be bound to the first uplink carrier for the uplink transmission and the downlink transmission, and is currently useable for downlink measurement.

14. The apparatus according to claim 10, wherein the one or more processors being configured to execute the non-transitory instructions to thereby cause the apparatus to determine the first uplink carrier comprises further causing the apparatus to:

determine the first uplink carrier as is for uplink measurement;

determine the first uplink carrier is available for uplink transmission; or determine the first uplink carrier is for uplink transmission.

15. The apparatus according to claim 10, wherein the one or more processors is further configured to execute the non-transitory instructions to thereby further cause the apparatus to:

add a third uplink carrier, and updating the first cell;

change the third uplink carrier to the first uplink carrier, and updating the first cell; or delete the first uplink carrier, and updating the first cell.

16. The apparatus according to claim 15, wherein the first downlink carrier and the third downlink carrier are a same uplink carrier.

17. The apparatus according to claim 10, wherein before the one or more processors being configured to execute the non-transitory instructions to thereby cause the apparatus to determine the first uplink carrier, the one or more processors being further configured to execute the non-transitory instructions to further cause the apparatus to:

receive a message 1, wherein the message 1 comprises at least one of the following:

a carrier frequency, a carrier index, a carrier identifier of the at least one uplink carrier, a random access configuration parameter, a reference signal configuration, or timing advance group (TAG) information.

18. The apparatus according to claim 10, wherein before the one or more processors being configured to execute the non-transitory instructions to thereby cause the apparatus to determine the first uplink carrier, the one or more processors being further configured to execute the non-transitory instructions to further cause the apparatus to:

access a network device, wherein an uplink carrier useable by the terminal to communicate with the network device is the second uplink carrier, and a downlink carrier useable by the terminal to communicate with the network device is the third downlink carrier, wherein the third downlink carrier is useable for downlink communication before the first uplink carrier is determined, or the third downlink carrier is useable to receive at least one of a downlink signal or downlink information before the first uplink carrier is determined.

19. The apparatus according to claim 10, wherein the one or more processors being configured to execute the non-transitory instructions to thereby cause the apparatus to determine the first uplink carrier, the one or more processors being further configured to execute the non-transitory instructions to further cause the apparatus to:

send a preamble signal or a reference signal to at least one uplink carrier; and receive the message 4 by using the third downlink carrier; and determining, based on the message 4, that the at least one uplink carrier is the first uplink carrier.

20. A non-transitory computer-readable storage medium, wherein the non-transitory computer-readable storage medium stores instructions, and when the instructions are run on a computer, the computer is enabled to perform the method according to claim 1.

* * * * *